US008441657B2

(12) United States Patent
Koike

(10) Patent No.: US 8,441,657 B2
(45) Date of Patent: May 14, 2013

(54) PRINT JOB MANAGEMENT METHOD AND IMAGE FORMING APPARATUS

(75) Inventor: Hiroaki Koike, Kokubunji (JP)

(73) Assignee: Canon Kabushiki Kaisha, Tokyo (JP)

( * ) Notice: Subject to any disclaimer, the term of this patent is extended or adjusted under 35 U.S.C. 154(b) by 1118 days.

(21) Appl. No.: 12/021,901

(22) Filed: Jan. 29, 2008

(65) Prior Publication Data

US 2008/0180742 A1 Jul. 31, 2008

(30) Foreign Application Priority Data

Jan. 31, 2007 (JP) ................................. 2007-022240

(51) Int. Cl.
*G06K 15/00* (2006.01)

(52) U.S. Cl.
USPC ............ 358/1.14; 358/1.1; 358/1.6; 358/1.13; 358/1.15; 358/1.16; 399/82; 399/85; 399/87

(58) Field of Classification Search ........................ None
See application file for complete search history.

(56) References Cited

U.S. PATENT DOCUMENTS

| | | | | |
|---|---|---|---|---|
| 5,923,919 | A * | 7/1999 | Nimura et al. ................. | 399/37 |
| 7,397,573 | B2 * | 7/2008 | Baba ............................. | 358/1.13 |
| 7,646,999 | B2 * | 1/2010 | Tanaka .......................... | 399/82 |
| 7,710,591 | B2 * | 5/2010 | Kinoshita .................... | 358/1.16 |
| 2002/0118387 | A1 * | 8/2002 | Patton .......................... | 358/1.15 |
| 2003/0011805 | A1 * | 1/2003 | Yacoub ........................ | 358/1.15 |
| 2005/0100378 | A1 * | 5/2005 | Kimura et al. ................ | 400/76 |
| 2006/0034630 | A1 * | 2/2006 | Yabe ............................ | 399/82 |

FOREIGN PATENT DOCUMENTS

| | | |
|---|---|---|
| JP | 9-254485 | 9/1997 |
| JP | 09-282121 A | 10/1997 |
| JP | 10-098578 A | 4/1998 |
| JP | 2001-096864 A | 4/2001 |
| JP | 2003-170643 A | 6/2003 |
| JP | 2004-120318 A | 4/2004 |

OTHER PUBLICATIONS

The above references were cited in a Jul. 4, 2011 Japanese Office Action, a which is enclosed without an English Translation, that issued in Japanese Patent Application No. 2007-022240.
The above references were cited in a Feb. 6, 2012 Japanese Office Action, a which is enclosed without an English Translation, that issued in Japanese Patent Application No. 2007-022240.

* cited by examiner

*Primary Examiner* — Miya J Cato
(74) *Attorney, Agent, or Firm* — Cowan, Liebowitz & Latman, P.C.

(57) ABSTRACT

In a system configured to enable a printing unit to execute another job preferentially to a job not prepared for printing, when no predetermined time has elapsed from a timing in which it has been determined that the job was not prepared for printing, it is inhibited to execute the other job preferentially to the job. When the predetermined time has elapsed from the timing, it is permitted to execute the other job preferentially to the job. This configuration can prevent unconditionally executing the another job preferentially to the job not prepared for printing.

11 Claims, 31 Drawing Sheets

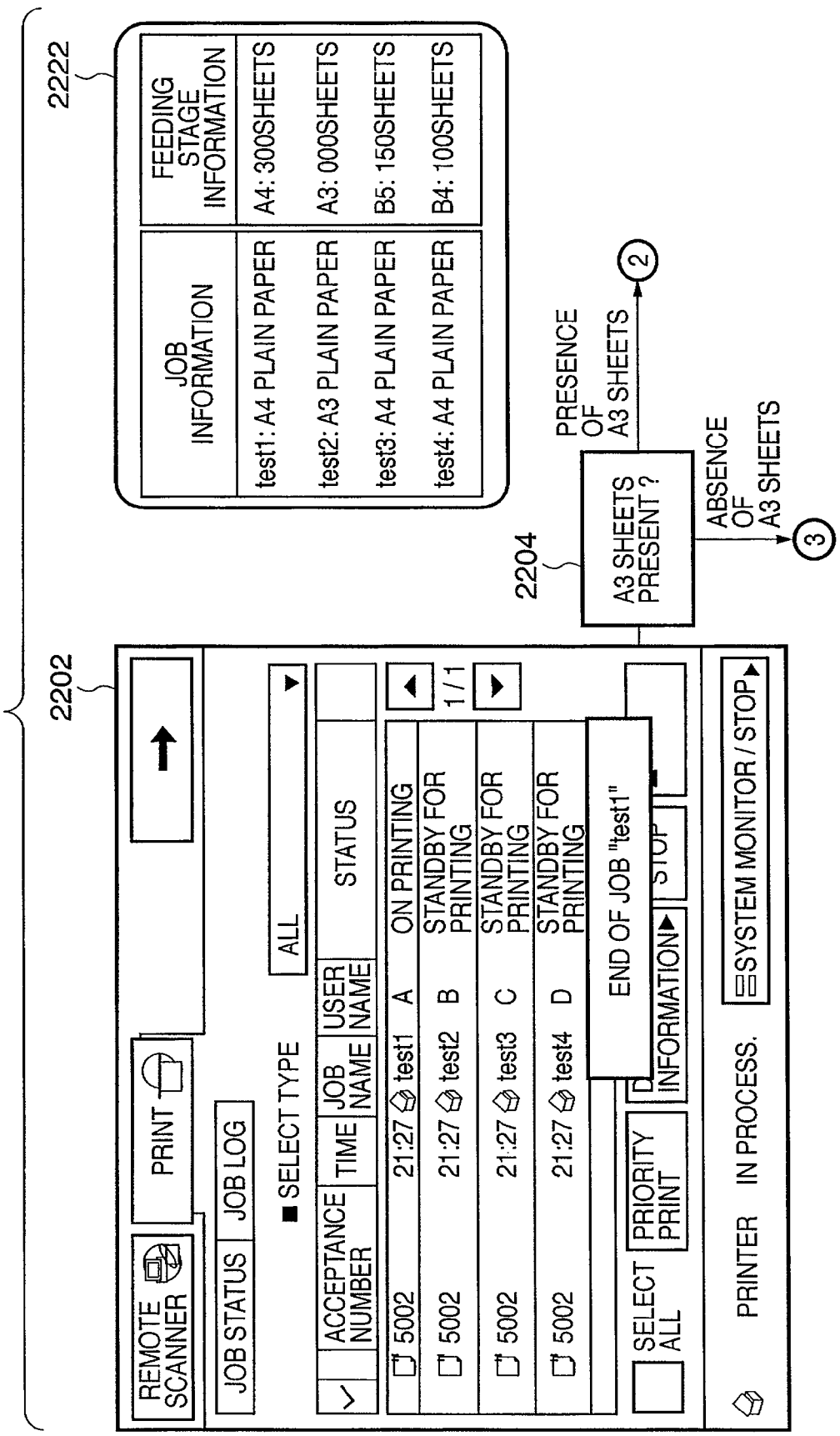

FIG. 6B

2206 — [screen 1]
- REMOTE SCANNER | PRINT | →
- JOB STATUS | JOB LOG
- ■SELECT TYPE  ALL ▼

| ✓ | ACCEPTANCE NUMBER | TIME | JOB NAME | USER NAME | STATUS |
|---|---|---|---|---|---|
| | 5002 | 21:27 | test2 | B | ERROR |
| | 5002 | 21:27 | test3 | C | STANDBY FOR PRINTING |
| | 5002 | 21:27 | test4 | D | STANDBY FOR PRINTING |

1/1

SELECT ALL | PRIORITY PRINT | INFORMATION▶ | STOP

SHEET ABSENCE ERROR SCREEN

⬨ 5004 PRINTER SHEETS ARE ABSENT.   ≡SYSTEM MONITOR / STOP▶

ABSENCE OF SHEETS FOR JOB

② END OF JOB "test2"

2208 — [screen 2]
- REMOTE SCANNER | PRINT | →
- JOB STATUS | JOB LOG
- ■SELECT TYPE  ALL ▼

| ✓ | ACCEPTANCE NUMBER | TIME | JOB NAME | USER NAME | STATUS |
|---|---|---|---|---|---|
| | 5002 | 21:27 | test3 | C | ON PRINTING |
| | 5002 | 21:27 | test4 | D | STANDBY FOR PRINTING |

1/1

SELECT ALL | PRIORITY PRINT | INFORMATION▶ | STOP

EXECUTE NEXT JOB

⬨ 5004 PRINTER SHEETS ARE ABSENT.   ≡SYSTEM MONITOR / STOP▶

SYSTEM SETTINGS

- SYSTEM MANAGER SETTINGS
- DEVICE INFORMATION SETTINGS
- DEPARTMENT ID MANAGEMENT
- NETWORK SETTINGS
- AUTO PROMOTE SETTINGS — 1004
- REMOTE UI ON / OFF
- AUTO ONLINE / OFFLINE

1/4

DONE

SYSTEM STATUS / STOP

1012  1014

COMMON SETTINGS

AUTO PROMOTE SETTINGS

| | | | |
|---|---|---|---|
| COPY | ON  OFF | 0 SEC | − + |
| PRINTER | ON  OFF | 0 SEC | − + |
| BOX | ON  OFF | 0 SEC | − + |
| SEND / FAX | ON  OFF | 0 SEC | − + |
| OTHERS | ON  OFF | 0 SEC | − + |

DONE

SYSTEM STATUS / STOP

FIG. 9

[Top screen 1026]

- REMOTE SCANNER | PRINT | →
- JOB STATUS | JOB LOG
- ■ SELECT TYPE | ALL ▼

| ✓ | ACCEPTANCE NUMBER | TIME | JOB NAME | USER NAME | STATUS |
|---|---|---|---|---|---|
| | 5002 | 21:27 | test1 | A | STANDBY FOR SUSPENSION |
| | 5002 | 21:27 | test2 | B | STANDBY FOR PRINTING |
| | 5002 | 21:27 | test3 | C | STANDBY FOR PRINTING |
| | 5002 | 21:27 | test4 | D | STANDBY FOR PRINTING |

1/1  ▲ ▼  EX-TEND  RE-SUME

SELECT ALL | PRIORITY PRINT | DETAILED INFORMATION ▶ | STOP | 🔒

5003 BOX          ☰ SYSTEM MONITOR / STOP ▶

PRINTER: SEETS ARE ABSENT,
test1: JOB WILL BE SUSPENDED AFTER 30 SEC.

1028          ⇩ PRESS OF "EXTEND" BUTTON          1030

[Bottom screen 1032]

SHEET SUPPLY SCREEN

SUPPLY SHEETS.

AFTER SUPPLYING SHEETS,
CLICK "OK".

IF SHEETS ARE NOT SUPPLIED,
CLICK "CANCEL".          — 1034

CANCEL — 1038          OK ↵ — 1036

☰ SYSTEM STATUS / STOP ▶

FIG. 10

1040 — [top screen]

- REMOTE SCANNER | PRINT | →
- JOB STATUS | JOB LOG
- ■SELECT TYPE    ALL ▼

| ✓ | ACCEPTANCE NUMBER | TIME | JOB NAME | USER NAME | STATUS |
|---|---|---|---|---|---|
|   | 5002 | 21:27 | test1 | A | SUSPENDED |
|   | 5002 | 21:27 | test2 | B | SUSPENDED |
|   | 5002 | 21:27 | test3 | C | SUSPENDED |
|   | 5002 | 21:27 | test4 | D | SUSPENDED |

1042 — (list area)

1/1  ▲ ▼  RESUME

[ ] SELECT ALL | PRIORITY PRINT | DETAILED INFORMATION▶ | STOP | 🔒

5003 BOX            ≡SYSTEM MONITOR / STOP▶

⇩ JOB SELECTION

1040 — [bottom screen]

- REMOTE SCANNER | PRINT | →
- JOB STATUS | JOB LOG
- ■SELECT TYPE    ALL ▼

| ✓ | ACCEPTANCE NUMBER | TIME | JOB NAME | USER NAME | STATUS |
|---|---|---|---|---|---|
| [1] | 5002 | 21:27 | test1 | A | SUSPENDED |
|   | 5002 | 21:27 | test2 | B | SUSPENDED |
|   | 5002 | 21:27 | test3 | C | SUSPENDED |
|   | 5002 | 21:27 | test4 | D | SUSPENDED |

1/1  ▲ ▼  RESUME — 1044

[ ] SELECT ALL | PRIORITY PRINT | DETAILED INFORMATION▶ | STOP | 🔒

5003 BOX   READY FOR PRINTING.     ≡SYSTEM MONITOR / STOP▶

FIG. 11B

| JOB NAME | SHEET SIZE |
|----------|------------|
| test1 | A4 |
| test2 | A3 |
| test3 | A4 |
| test4 | A4 |

1043

---

1040

REMOTE SCANNER | PRINT | →

JOB STATUS | JOB LOG

■SELECT TYPE  ALL ▼

| ✓ | ACCEPTANCE NUMBER | TIME | JOB NAME | USER NAME | STATUS |
|---|---|---|---|---|---|
| | 5002 | 21:27 | test1 | A | SUSPENDED |
| | 5002 | 21:27 | test2 | B | ON PRINTING |
| | 5002 | 21:27 | test3 | C | SUSPENDED |
| | 5002 | 21:27 | test4 | D | SUSPENDED |

1/1

1048

SELECT ALL | PRIORITY PRINT | DETAILED INFORMATION▶ | STOP | 🔒

5003 BOX    test2: ON PRINTING    ≡SYSTEM MONITOR / STOP▶

START OF "A3" JOB

| | ACCEPTANCE NUMBER | TIME | JOB NAME | USER NAME | STATUS |
|---|---|---|---|---|---|
| | 5002 | 21:27 | test1 | A | SUSPENDED |
| | 5002 | 21:27 | test2 | B | SUSPENDED |
| | 5002 | 21:27 | test3 | C | SUSPENDED |
| | 5002 | 21:27 | test4 | D | SUSPENDED |

REMOTE SCANNER | PRINT

JOB STATUS | JOB LOG | ABSENT SHEET LIST — 1050

■ SELECT TYPE — ALL

1/1

RE-SUME

SELECT ALL | PRIORITY PRINT | DETAILED INFORMATION▶ | STOP

5003 BOX      ☰ SYSTEM MONITOR / STOP ▶

PRESS OF "ABSENT SHEET LIST"

*(1043)*

| JOB NAME | SHEET SIZE |
|---|---|
| test1 | A4 |
| test2 | A3 |
| test3 | A4 |
| test4 | A4 |

FIG. 12B

| ✓ | ACCEPTANCE NUMBER | TIME | JOB NAME | USER NAME | STATUS |
|---|---|---|---|---|---|
| | 5002 | 21:27 | test1 A4 | A | SUSPENDED |
| | 5002 | 21:27 | test2 A3 | B | SUSPENDED |
| | 5002 | 21:27 | test3 A4 | C | SUSPENDED |
| | 5002 | 21:27 | test4 A4 | D | SUSPENDED |

REMOTE SCANNER | PRINT → ~1052

1/1  RE-SUME

SELECT ALL | PRIORITY PRINT | DETAILED INFORMATION▸ | STOP | 🔒

CANCEL | SHEET LIST ▸ ~1054

5003 BOX | ☰SYSTEM MONITOR / STOP▸

PRESS OF "OK" ⇑   ⇓ PRESS OF "SHEET LIST"

~1056

| SIZE OF SHEET | NUMBER OF SHEETS |
|---|---|
| A4 | 20 |
| A3 | 10 |

OK ↵ ~1058

☰SYSTEM STATUS / STOP▸

| | REMOTE SCANNER | PRINT | → |
|---|---|---|---|

JOB STATUS | JOB LOG    EXTRACT SAME SIZE SHEET WAITING JOBS

■SELECT TYPE    ALL ▼

| ✓ | ACCEPTANCE NUMBER | TIME | JOB NAME | USER NAME | STATUS |
|---|---|---|---|---|---|
| | 5002 | 21:27 | test1 | A | SUSPENDED |
| | 5002 | 21:27 | test2 | B | SUSPENDED |
| | 5002 | 21:27 | test3 | C | SUSPENDED |
| | 5002 | 21:27 | test4 | D | SUSPENDED |

1/1 ▲▼    RE-SUME

SELECT ALL | PRIORITY PRINT | DETAILED INFORMATION▶ | STOP | 🔒

5003 BOX      ≡ SYSTEM MONITOR / STOP ▶

⟹ JOB SELECTION

1043

| JOB NAME | SHEET SIZE |
|---|---|
| test1 | A4 |
| test2 | A3 |
| test3 | A4 |
| test4 | A4 |

FIG. 13B

F I G. 20
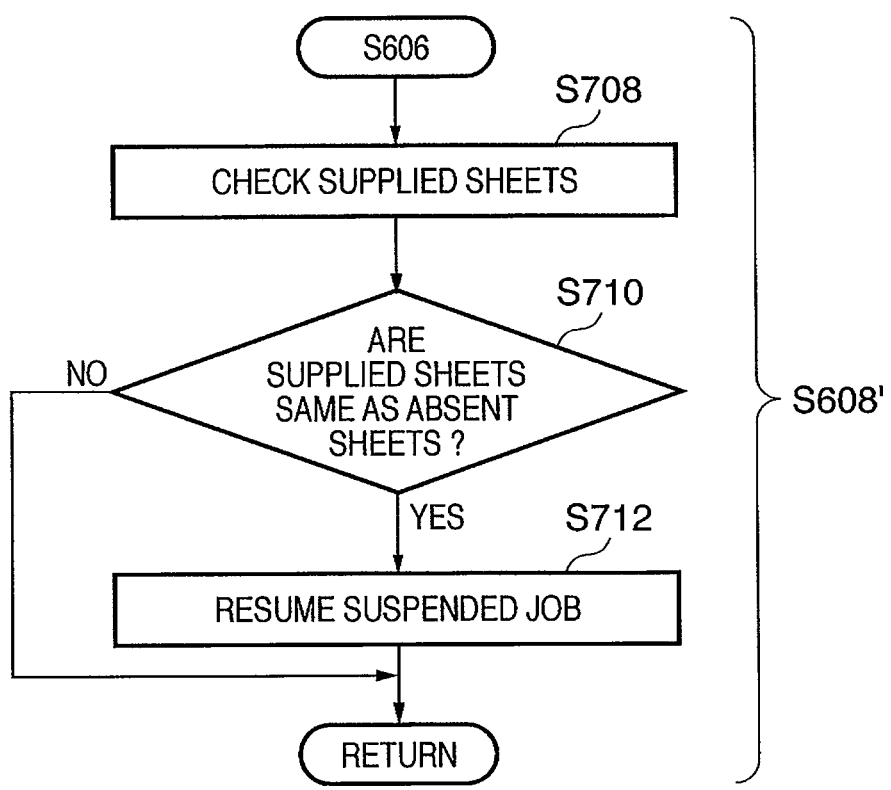

PRINT JOB MANAGEMENT METHOD AND IMAGE FORMING APPARATUS

BACKGROUND OF THE INVENTION

1. Field of the Invention

The present invention relates to a print job management method and an image forming apparatus, more particularly, a print job management method of transiting a print job to the suspended state when consumables such as sheets necessary for the print job are absent at the start of printing based on the print job, and an image forming apparatus performing the print job management method.

2. Description of the Related Art

When designated consumables are absent, for example, designated sheets are absent in any feeding stages at the start of printing in an image forming apparatus which forms an image on a print medium such as a sheet, a print job is suspended after, for example, displaying an error. For example, in Japanese Patent Laid-Open No. 9-254485, when sheets of a required print size are not loaded or run out, the print data is saved in a memory. When sheets of the required print size have been loaded or replenished to enable printing at the sheets of required size, it is made possible to print using the saved print data.

According to the conventional method, for example, even if subsequent print jobs include a print job printable using sheets of another size left in a feeding stage, no printing of any other print jobs can be executed till the end of printing based on the first print job. Conventionally, print data has been saved when it is determined that sheets run out. Thus, even if printing based on a currently executed but suspended print job can be resumed after simple replenishment work, a troublesome operation is necessary to resume the suspended print job. Consumables designated by a print job are not limited to sheets. The same problems arise even in print job control based on the presence/absence of consumables such as staples or toner.

SUMMARY OF THE INVENTION

The present invention has been made to overcome the conventional drawbacks. An object of the present invention is to provide a print job management method and image forming apparatus capable of resuming a currently executed but suspended print job by simple replenishment of consumables. It is another object of the present invention to provide a print job management method and image forming apparatus capable of starting printing based on a subsequent print job even when a currently executed print job is suspended.

To solve the above-described problems, a system according to the present invention which is configured to enable a printing unit to execute another job preferentially to a job not prepared for printing. The system comprises: an inhibiter adapted to inhibit executing the other job preferentially to the job when a predetermined time has not elapsed from a timing in which a determination unit determined that the job was not prepared for printing; and a permitter adapted to permit executing the other job preferentially to the job when the predetermined time has elapsed from the timing.

The predetermined time is set in advance based on an instruction from a user interface. The predetermined time is extended by an instruction from a user interface. The predetermined time is set respectively for each type of job executable by the printing unit. The system further comprises another inhibiter adapted to, when an operator does not set in advance from a user interface to execute the other job preferentially to the job, inhibit executing the other job preferentially to the job even when the predetermined time has elapsed from the timing.

A method according to the present invention controls a system which is configured to enable a printing unit to execute another job preferentially to a job not prepared for printing. The method comprises the steps of: inhibiting executing the other job preferentially to the job when a predetermined time has not elapsed from a timing in which a determination unit determined that the job was not prepared for printing; and permitting executing the other job preferentially to the job when the predetermined time has elapsed from the timing.

The present invention can provide a print job management method and image forming apparatus capable of resuming a currently executed but suspended print job by simple replenishment of consumables, and capable of starting printing based on a subsequent print job when a currently executed print job is suspended.

That is, if sheets necessary for printing based on a print job are absent in the image forming apparatus, but printing based on a subsequent print job is possible, printing based on the subsequent print job starts first while suspending the first print job. This can eliminate the downtime of the image forming apparatus and increase the ratio of operating at the image forming apparatus.

A print job is transited to the suspend state after the lapse of a preset time. If the user has replenished sheets before the lapse of the preset time, printing based on the first print job can be continued without suspension.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 6A to 6C are a view showing a concrete example of automatic promotion in the embodiment;

FIG. 7B is a view showing an example of setting a time before transiting a current job to the suspended state for each job type in the embodiment;

FIG. 9 is a view showing an example of operating a button for extending the time before transiting a current job to the suspended state in the embodiment;

FIG. 10 is a view showing an example of operating a button for resuming a suspended job in the embodiment;

FIGS. 11A and 11B are a view showing an operation example when checking sheets and trying to resume a suspended job after a paper cassette has been set again in the embodiment;

FIGS. 12A and 12B are a view showing an operation example when displaying a sheet list in the embodiment;

FIGS. 13A and 13B are a view showing an operation example when displaying a list of suspended jobs waiting for the same sheets in the embodiment;

FIG. 20 is a flowchart showing a processing sequence when checking sheets and trying to resume a suspended job after setting a paper cassette again in the embodiment;

DESCRIPTION OF THE EMBODIMENTS

An embodiment of an image forming apparatus adopted in the present invention will be described below with reference to the accompanying drawings.

<Configuration Example of Printing Network Including Image Forming Apparatus According to Embodiment>

Figure 1:
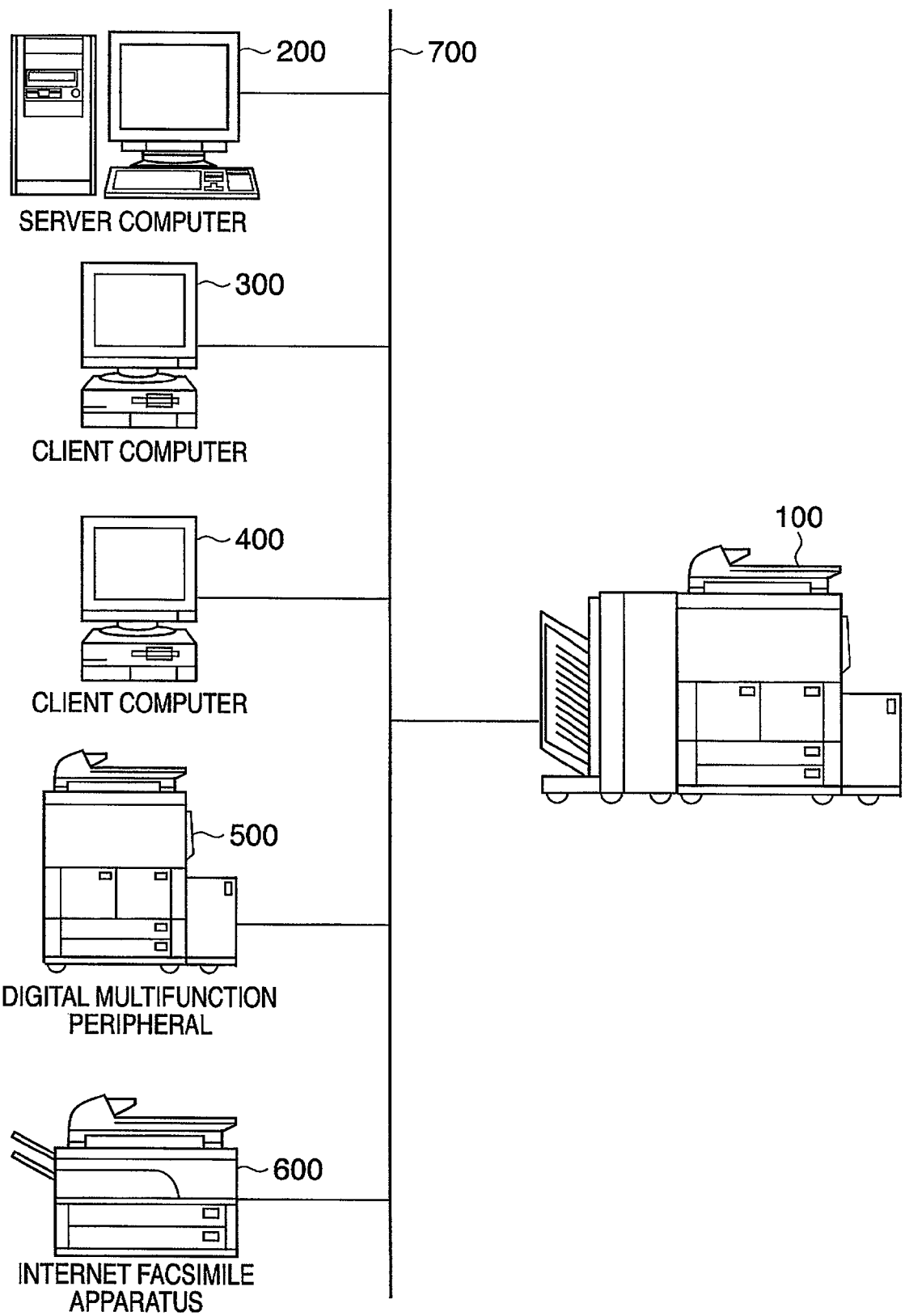
FIG. 1 is a view showing a configuration of a printing network including a printing system in an embodiment.

FIG. 1 is a view showing a configuration of a printing network including a network compliant printing system corresponding to the image forming apparatus according to the embodiment.

In FIG. 1, a printing system 100 can communicate various data (transmit/receive data) with other apparatuses via a communication medium 700 such as a network. Other apparatuses capable of communicating data with the printing system 100 are, for example, a server computer 200, and client computers 300 and 400 such as host computers. Other apparatuses capable of communicating data with the printing system 100 are also other systems having the same configuration and functions as those of the printing system 100, for example, a digital multifunction peripheral (to be also referred to as a MFP hereinafter) 500 and an Internet facsimile apparatus 600. Data communication between the printing system 100 and other apparatuses is not limited to wired communication and may also be wireless communication or a combination of them.

The printing system 100 has a plurality of modes (or functions) such as a copy mode, print mode, and facsimile mode. The printing system 100 stores print job data read by a reader unit 103 (see FIG. 2A to be described later) of the printing system 100, or print job data input from an external apparatus in a storage unit such as the hard disk of the printing system 100. The printer unit of the printing system 100 can print data stored in the storage unit. The embodiment adopts a backup memory 109 as the storage unit.

The printing system 100 can receive job data to be printed from a variety of external apparatuses. For example, the printing system 100 can accept job data transmitted from an information processing apparatus such as the client computer 300 or 400. The printing system 100 can also accept print job data read by the scanner unit of the digital multifunction peripheral 500 from the digital multifunction peripheral 500 serving as another printing apparatus. The printing system 100 can also accept data output from the Internet facsimile apparatus 600 as job data to be printed. The printing system 100 can transfer the job data to another apparatus via the communication unit (for example, a computer interface unit 106 (see FIG. 2A to be described later)) of the printing system 100, or execute various output processes. This specification uses various expressions such as a print job, a job to be printed, or simply a job, which are identical.

As a mechanical structure, the reader unit 103 of the printing system 100 comprises an auto document feeder (so-called ADF). The ADF can successively, sequentially read a plurality of document sheets automatically from the first page. A printer unit 104 (see FIG. 2A to be described later) of the printing system 100 comprises a plurality of feeding units (paper cassettes). The feeding units can store print sheets of different medium types (different in print sheet size, print sheet type, and the like). A print is selectively fed from a feeding unit the user wants, and the printer unit 104 can print on a print sheet of a desired type.

The printing system 100 has a finisher serving as a sheet processing apparatus for executing sorting, stapling, punching, and saddle-stitching functions. A finisher capable of executing a variety of finishing processes is connectable to a printing apparatus main body 101 (see FIG. 2A) of the printing system 100. The printer unit 104 can execute print processing of print data of a job in the backup memory 109 such as a hard disk capable of accumulating print data of jobs. The printing system 100 can supply a job sheet printed by the printer unit 104 of the printing apparatus main body 101 to an internal unit of the finisher. The printing system 100 can cause the finisher to execute, to the job sheet, finishing designated by the user for the target job.

For example, the sorting function as an example of finishing functions is to sort sheets printed by the printer unit 104. The stapling function is to staple print sheets. The punching function is to punch sheets printed by the printer unit. The saddle-stitching function is to fold and bind sheets printed by the printer unit 104.

A control unit 108 in FIG. 2A to be described later performs control of various jobs in the printing system 100, UI (User Interface) control accompanying this control, and operation control of respective units. These controls by the control unit 108 are achieved by reading out a computer-executable control program stored in the backup memory 109 or the like and executing the read out program.

The embodiment discloses a configuration in which the control unit 108 controls the printing system 100 capable of executing print processing of a target job by the printing apparatus main body 101. The control unit 108 confirms whether or not there are resources necessary to complete print processing of a target job (to be referred to as the first job).

If resources necessary to complete print processing of the first job do not exist in the printing system 100, the control unit 108 inhibits the printing apparatus main body 101 from executing print processing of the first job. The control unit 108 allows the printing apparatus main body 101 to execute print processing of at least a subsequent job (to be referred to as the second job), print execution of which is requested after the first job.

However, even when resources necessary to complete print processing of the first job do not exist in the printing system 100, the control unit 108 inhibits the printing apparatus main body 101 from executing print processing of the second job until a predetermined period has elapsed. The predetermined period can be set by the operator via a user interface unit (an operation unit in FIG. 2A) disclosed in the embodiment.

Assume that resources necessary to complete print processing of the first job are prepared in the printing system 100 before the predetermined period has elapsed. In this case, the control unit 108 causes the printing apparatus main body 101 to execute print processing of the first job without starting print processing of the second job. Then in this case, the control unit 108 controls the printing system 100 to cause the printing apparatus main body 101 to start print processing of the second job in response to the end of printing of the first job.

To the contrary, assume that the control unit 108 confirms that resources necessary to complete print processing of the first job have not been prepared in the printing system 100 even upon the lapse of the predetermined period. In this case, the control unit 108 permits the printing apparatus main body 101 to execute print processing of the second job in response to the lapse of the predetermined period. Then in this case, the control unit 108 controls the printing system 100 to cause the printing apparatus main body 101 to start or restart print processing of the first job in response to the end of printing of the second job.

In the embodiment, the control unit 108 executes these controls. A configuration disclosed below is a typical configuration of these configurations.

<Configuration Example of Printing System According to Embodiment>

(Block Configuration Example of Printing System)

Figure 2A:
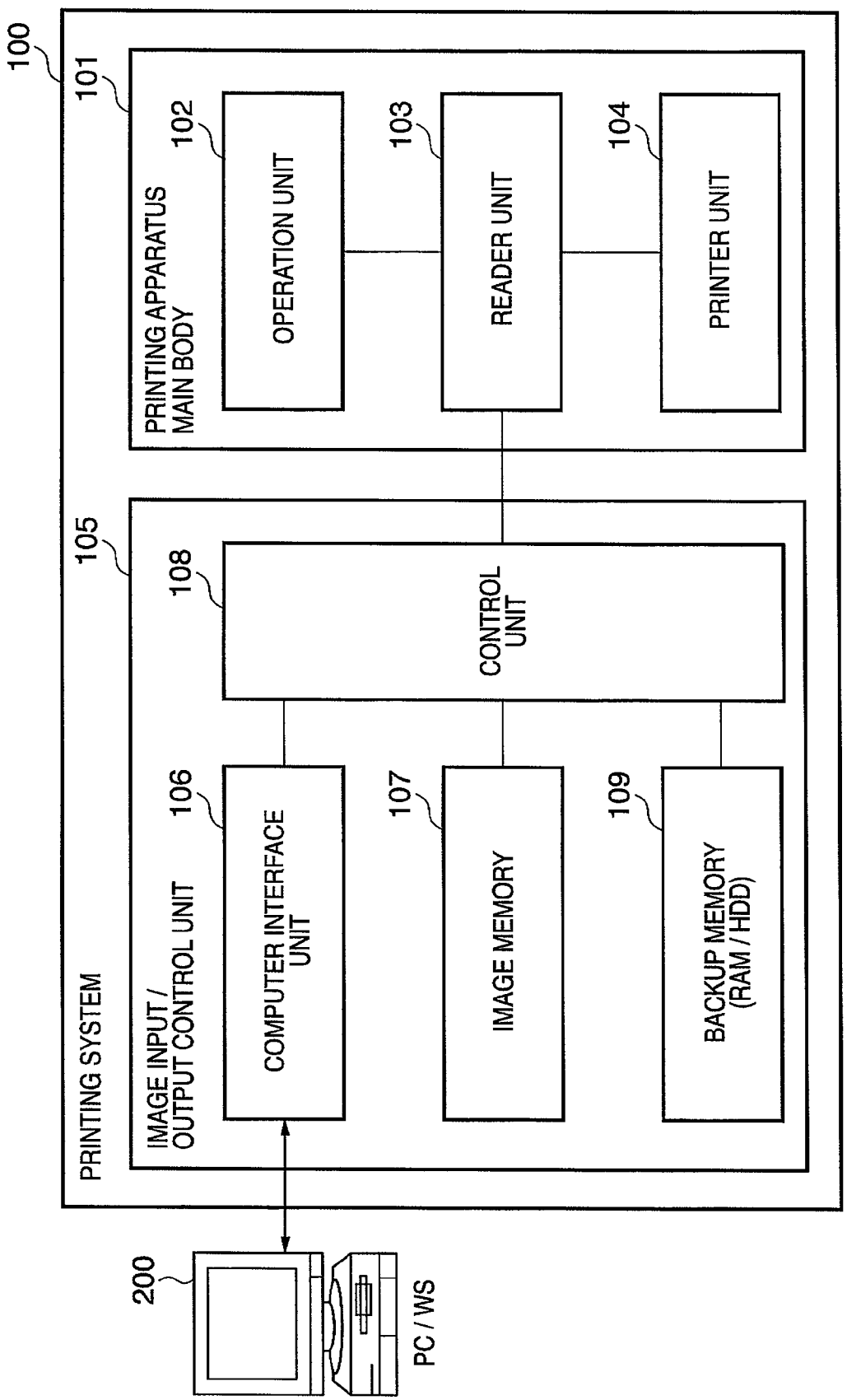
FIG. 2A is a block diagram showing a configuration of a printing system 100 in the embodiment.

FIG. 2A is a block diagram showing the detailed configuration of the printing system 100 in FIG. 1 according to the embodiment.

As shown in FIG. 2A, the printing system 100 according to the embodiment roughly comprises the printing apparatus main body 101 and an image input/output control unit 105. The printing apparatus main body 101 comprises an operation unit 102, the reader unit (or scanner unit) 103, and the printer unit 104. In practice, the housing of the printing apparatus main body 101 also incorporates the image input/output control unit 105. The printing apparatus main body 101 is connected to a finisher, which will be described later with reference to FIG. 3.

The operation unit 102 is used by an operator to operate the printing apparatus main body 101 and image input/output control unit 105. For example, the operation unit 102 includes a touch panel type liquid crystal display unit and mechanical hard keys, and prompts the operator to make various settings. The reader unit 103 has a document feeder such as an ADF, as described above. The reader unit 103 reads the image of a document set on the document table, and outputs the read image data to the printer unit 104 and image input/output control unit 105. The printer unit 104 prints image data from the reader unit 103 and image input/output control unit 105 on print media such as print sheets under print processing conditions set for job data.

The operation unit 102 having the display unit corresponds to an example of the user interface unit (to be also referred to as a UI unit hereinafter) in the embodiment. The UIs of information processing apparatuses such as the computers 200 to 400, or those of external apparatuses such as other printing apparatuses (for example, the MFP 500 and Internet facsimile apparatus 600) also correspond to examples of the UI unit in the embodiment. The UI unit of the embodiment includes at least one of a keyboard, pointing device (for example, mouse), display device, operation panel, and the like. However, the arrangement of the UI unit is not limited to the embodiment.

The image input/output control unit 105 comprises the control unit 108 (connected to the reader unit 103 in FIG. 2A), the computer interface unit 106 connected to the communication medium 700, an image memory 107, and the backup memory (RAM/HDD) 109. The control unit 108, though not shown, comprises a CPU, program memory, and work memory, and controls the overall printing system 100.

The computer interface unit 106 functions as an external communication unit, and interfaces between the control unit 108 and an external apparatus (each apparatus connected to the communication medium 700 shown in FIG. 1). The printing system 100 communicates data with an external apparatus via the computer interface unit 106. An example of the external apparatus is a print server (server computer 200) formed from a personal computer or work station (PC/WS). The computer interface unit 106 rasterizes code data (PDL), which is transferred from the server computer 200 and represents an image, into image data printable by the printer unit 104, and transfers the image data to the control unit 108. The computer interface unit 106 also transmits/receives various data (for example, command data, status request information, status information, and time data) other than image data to/from an external apparatus. The control unit 108 controls the flow of data between the reader unit 103, the computer interface unit 106, the image memory 107, and the backup memory 109.

The backup memory 109 is a nonvolatile memory unit in which stored data is held even upon power-off. The backup memory 109 saves important data which needs to be backed up in the printing apparatus main body 101 and image input/output control unit 105. That is, the backup memory 109 has a storage area capable of storing and holding a plurality of unprocessed job data (and a series of image data). The backup memory 109 can store and hold image data, job data, and the like input from the reader unit 103 and an external apparatus. The backup memory 109 is formed from a backup RAM, backup hard disk, or the like. In this example, the printing system 100 comprises a nonvolatile large-capacity memory capable of accumulating a plurality of job data, but the present invention is not limited to this. For example, an external apparatus may also comprise a memory unit for storing a plurality of job data to be printed by the printing system 100.

In addition, the backup memory 109 is also available for preventing loss of data, as a matter of course. However, the backup memory 109 is not used for only this purpose. For example, the backup memory 109 is also used for satisfying, for example, a need to print data the user wants in a desired print style at a desired timing several times.

For example, the printing system 100 can provide a box function using the backup memory 109. In this case, the following configuration is adopted. For example, an external computer or the printing system 100 can prompt the user to select the box function via the user interface unit of the external computer or printing system 100. After selecting the box function, the user can input document data of a target job or the like from the reader unit 103 or external computer to the printing system 100. The document data of the job input while the box function is selected is saved in a box designated by the user among a plurality of data storage boxes virtually allocated in the backup memory 109.

The printing system 100 also allows the user to select the box function via the user interface unit provided by the operation unit 102, select a desired box, and select desired data from the selected box. The control unit 108 controls the printing system 100 to be able to print the selected job data by the printer unit 104 or transmit the selected job data to an external apparatus under processing conditions set by the user via the operation unit 102 of the printing system 100. The backup memory 109 is also available for providing the box function. In the embodiment, the control unit 108 of the printing system 100 executes various control operations described above.

As described above, the printing system 100 of the embodiment can store a plurality of print job data in the backup memory 109 and sequentially process the plurality of print job data. For example, even while the printer unit 104 executes the print operation of a given print job, print job data (or image data) to be printed by the printer unit 104 can be accepted on request from an external apparatus or the reader unit (scanner unit) 103 of the printing system 100. In the embodiment, the control unit 108 of the printing system 100 causes the printing system 100 to execute a series of processing operations for a variety of jobs by controlling the respective units of the printing system 100.

(Configuration Example of Image Input/Output Control Unit 105, Especially Control Unit 108)

Figure 2B:
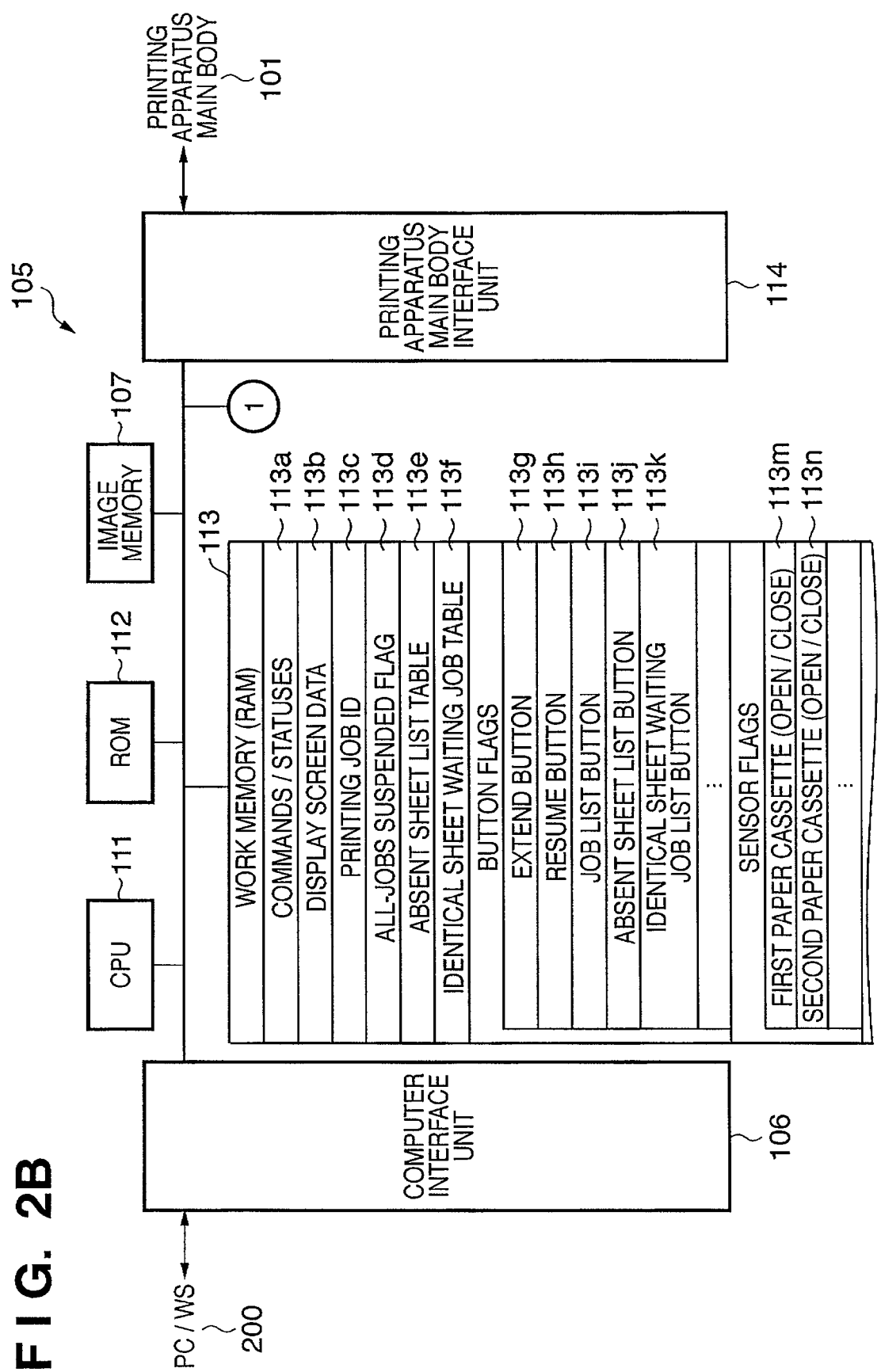
FIGS. 2B and 2C are a block diagram showing a configuration of an image input/output control unit in the embodiment.
Figure 2C:
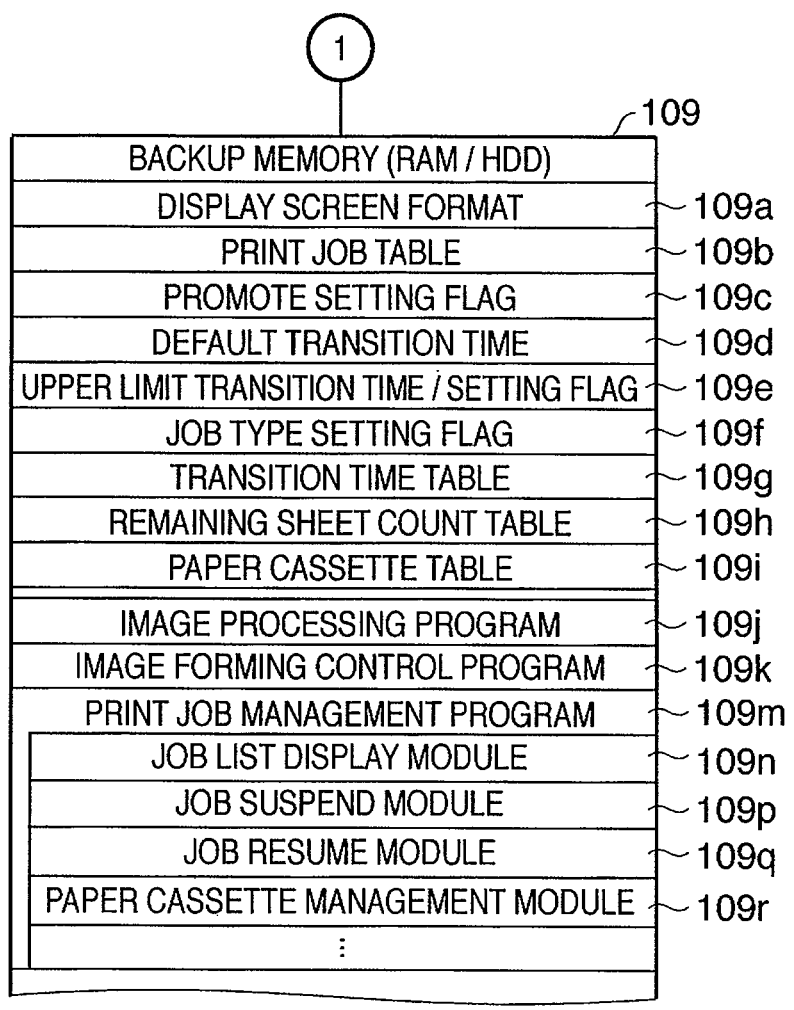

FIGS. 2B and 2C are a block diagram showing a hardware configuration of the image input/output control unit, especially the control unit 108 according to the embodiment.

In FIGS. 2B and 2C, an arithmetic and control CPU 111 controls the overall printing system 100. A ROM 112 stores permanent programs and permanent parameters for the startup of the CPU 111. A work memory 113 is used as a temporary storage area while the CPU 111 executes a computer program. In this example, the computer program executed by the CPU 111 is stored in the backup memory 109, but a program memory may also be additionally arranged. A printing apparatus main body interface unit 114 interfaces the printing apparatus main body 101.

A structure of the storage areas of the work memory (RAM) 113 for implementing a characteristic operation of the embodiment, and a storage example of data and programs stored in the backup memory (RAM/HDD) 109 will be explained.

The storage areas of various data used for the following print job management and control in the embodiment are allocated in the work memory (RAM) 113.

An area 113a stores commands and statuses. The area 113a stores commands and statuses exchanged with the computer (PC/WS) 200 via the computer interface unit 106 and the communication media 700. The area 113a also stores commands and statuses exchanged with the printing apparatus main body 101 via the printing apparatus main body interface unit 114. An area 113b stores display screen data generated to display a display screen on the operation unit 102 of the printing apparatus main body 101. An area 113c stores the ID of a print job on currently printing by the printing apparatus main body 101. An area 113d stores an all-jobs suspended flag which is used in the following embodiment (see FIG. 18) and represents that all print jobs have been suspended. The all-jobs suspended flag need not be stored in the memory when it is determined by a program whether all print jobs have been suspended. An area 113e stores an absent sheet list table which is used in the following embodiment (see FIGS. 12 and 21) in order to display a list of the types of absent sheets. The types of absent sheets may also be stored in a print job table 109b to be described later. An area 113f stores a same sheet waiting job table which is used in the following embodiment (see FIGS. 13 and 22) in order to display jobs waiting for same sheets which are currently absent.

Areas 113g to 113k store flags each representing a state of a button when clicking the button on the display screen. The area 113g stores a clicked state of an extend button for extending the time till transiting a print job to the suspended state in the following embodiment (see FIGS. 9 and 16). The area 113h stores a clicked state of a resume button for resuming a suspended print job in the following embodiment (see FIGS. 10, 13, 17, and 22). The area 113i a stores clicked state of a job list button for displaying a print job list in the following embodiment (see FIGS. 9 to 13 and 17). The job list button is not indispensable when a job list is displayed automatically upon generation of an event. The area 113j stores a clicked state of an absent sheet list button which is used in the following embodiment (see FIGS. 12 and 21) in order to display an absent sheet list. The area 113k stores a clicked state of a same sheet waiting job extraction button which is used in the following embodiment (see FIGS. 13 and 22) in order to extract and display jobs waiting for same sheets which are currently absent.

Areas 113m and 113n store flags each representing the result of detecting opening/closing of a paper cassette by a sensor in the embodiment. The area 113m stores a flag (open/close) for the first paper cassette. The area 113n stores a flag (open/close) for the second paper cassette. Flags are stored by the number of paper cassettes mounted in the printing apparatus main body 101.

The backup memory (RAM/HDD) 109 is nonvolatile and stores data and programs which need to be saved even upon power-off. The reference numerals 109a to 109i show data used in the embodiment. The reference numerals 109j to 109k, 109m, 109n, and 109p to 109r show programs executed for the embodiment.

The data 109a is a display screen format which is created and stored in advance in order to display a screen on the operation unit 102 of the printing apparatus main body 101. The current data is composed with the display screen format 109a, generating data in the display screen data area 113b. The data 109b is a print job table which accumulates print jobs received by the image input/output control unit 105 from the server computer 200. The print job table stores the name of a job, the name of a user who has created the job, and the current job status in correspondence with the job ID (job accepted number). The print job table may also store the type of consumables such as the sheet size, the ID of a consumables providing portion such as a paper cassette, and the like.

The data 109c is a promote setting flag which holds the set/reset of a promote mode in which transition to suspended state of printing is delayed when an error occurs owing to the absence of consumables in the embodiment. The data 109d is the default value of the transition time serving as the delayed period till transition to suspended state that is set in the promote mode. The default transition time is used when it is not set to change the transition time depending on the job type, which will be described later. The data 109e represents the upper limit of the transition time and a flag representing the setting of the upper limit. The data 109f is a job type setting flag which is set when changing the transition time depending on the job type. The data 109g is a transition time table (see FIG. 7B) which stores the transition time in correspondence with the job type. The data 109h is a remaining sheet count table which stores the remaining number of sheets for each paper cassette and each sheet size. When the remaining number of sheets is 0, it is determined that no sheet exists. The data 109*i* is a paper cassette table in which paper cassettes mounted in the printing apparatus main body 101 are registered. The paper cassette table 109*i* also stores the type of sheet such as the sheet size. The remaining sheet count table 109*h* and paper cassette table 109*i* may also be a common table.

The program 109*j* is an image processing program for controlling the printing system 100. The program 109*k* is an image forming control program for controlling the printing apparatus main body 101. The program 109*m* is a print job management program for managing and controlling a print job in the embodiment. The print job management program 109*m* includes the following modules 109*n* and 109*p* to 109*r* shown in the flowcharts of FIGS. 14 to 22 to be described later. The module 109*n* is a job list display module for controlling display of a print job list. The module 109*p* is a job suspend module for controlling suspension of a print job, for example, controlling the transition time in this example when consumables such as sheets are absent. The module 109*q* is a job resume module which controls resume of a suspended print job. The module 109*r* is a paper cassette management module which manages the current status (sheet size, remaining number of sheets, cassette open/close state, and the like) of a paper cassette.

(Structural Example of Printing Apparatus Main Body 101)

Figure 3:
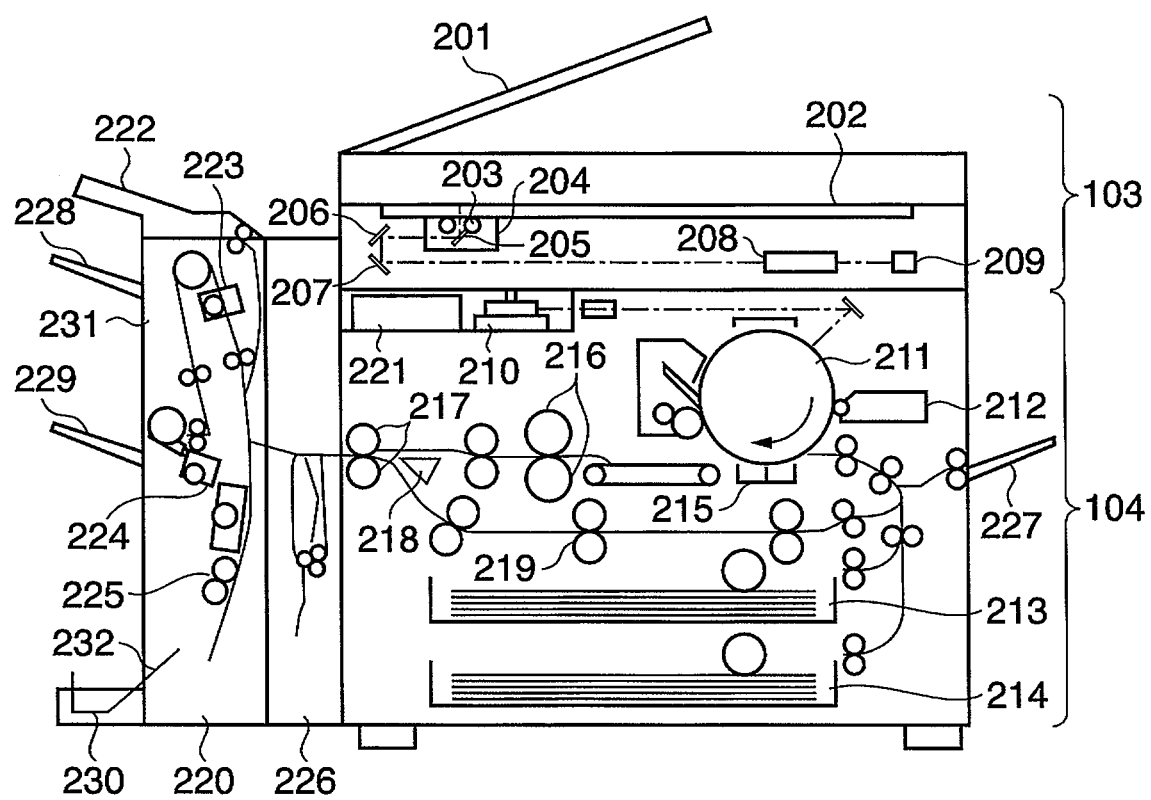
FIG. 3 is a sectional view showing a configuration of a printing apparatus main body 101 in the embodiment.

FIG. 3 is a sectional view of a system configuration when a finisher is attached to the printing apparatus main body 101 of the printing system 100 shown in FIG. 2A.

In FIG. 3, a document feeder 201 feeds document sheets one by one sequentially from the first sheet onto a platen glass 202. After the end of reading a document sheet, the document sheet is discharged from the platen glass 202.

When the document sheet is conveyed onto the platen glass 202, a lamp 203 is turned on. A scanner unit 204 starts moving, and exposes and scans the document sheet. Reflected light from the document sheet is guided to a CCD image sensor (to be referred to as a "CCD" hereinafter) 209 via mirrors 205, 206, and 207 and a lens 208. The CCD 209 reads the image on the scanned document sheet. The read image is stored as digital output image data in the backup memory 109.

A laser driver 221 drives a laser emitting portion 210 on the basis of output image data stored in the backup memory 109, and causes the laser emitting portion 210 to emit a laser beam corresponding to the output image data. The laser beam irradiates a photosensitive drum 211, forming a latent image corresponding to the laser beam on the photosensitive drum 211. A developer is attached from a developing unit 212 to the latent image on the photosensitive drum 211. For example, a color printing apparatus comprises developing units for four, yellow, magenta, cyan, and black.

A print sheet is fed from any one of cassettes 213 and 214 and a manual feed stage 227 at the timing synchronized with the start of laser beam irradiation. The print sheet is conveyed to a transfer portion 215. At the transfer portion 215, the developer attached to the photosensitive drum 211 is transferred onto the print sheet. The print sheet bearing the developer is conveyed to a fixing portion 216, and the developer is fixed onto the print sheet by the heat and pressure of the fixing portion 216. The print sheet having passed through the fixing portion 216 is discharged by discharge rollers 217.

When double-sided printing is set, a print sheet is conveyed to the discharge rollers 217. Then, the discharge rollers 217 reversely rotate to guide the print sheet to a re-feeding path 219 by a flapper 218. The print sheet guided to the re-feeding path 219 is fed again to the transfer portion 215 at the above-mentioned timing. Printing is done on the opposite surface of the print sheet.

When the printing system 100 comprises a Z-folding unit 226, the control unit 108 controls the printing system 100 to be able to convey a sheet printed by the printer unit 104 to the Z-folding unit 226. The control unit 108 controls the Z-folding unit 226 to Z-fold a printed material under print processing conditions set by the operator via the operation unit 102 for a target job.

When the printing system 100 comprises a finisher 220, the control unit 108 controls the printing system 100 to be able to supply a material printed by the printer unit 104 into the finisher 220. The control unit 108 causes the finisher 220 to sort printed materials of a target job under print processing conditions set by the operator for the target job. The control unit 108 causes a puncher 223 to punch printed materials of a target job under print processing conditions set by the operator for a target job. The control unit 108 causes the finisher 220 to saddle-stitch printed materials of a target job under print processing conditions set by the operator for a target job. In this case, a saddle stitcher 225 can be used to bind print sheets by stitching them at the center and folding them in two. The control unit 108 causes a stapler 224 to staple printed materials of a target job under print processing conditions set by the operator for a target job.

An inserter 222 can feed a sheet printed in advance as a cover or slip sheet. In this structure, a sheet printed in advance need not pass through the print sheet path of the printer unit 104, and can be conveyed without damaging the sheet. A print sheet of a job not using the saddle stitcher 225 passes through a delivery port 231 and is discharged to either a movable tray 228 or 229. Both the movable trays 228 and 229 can move vertically. When outputting a print sheet to the movable tray 228, the movable tray 228 moves down to the position of the delivery port 231. To the contrary, a print sheet of a job using the saddle stitcher 225 passes through the delivery port 232 and is discharged to a booklet tray 230. The control unit 108 executes even control concerning these operations.

(Arrangement Example of Operation Unit 102)

The operation unit 102 of the printing apparatus main body 101 in the printing system 100 according to the embodiment will be described with reference to the schematic view of the operation unit of FIG. 4.

Figure 4:
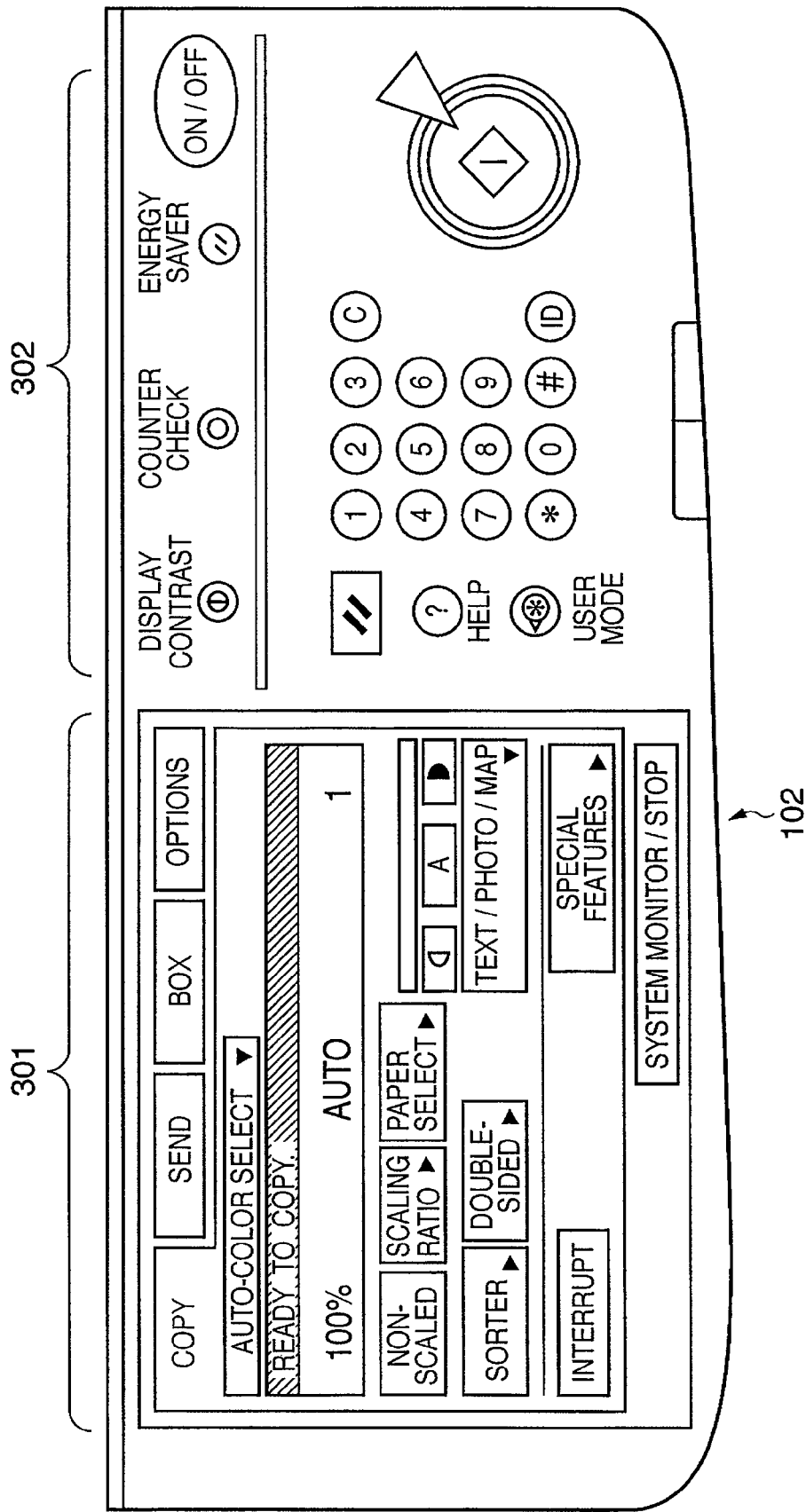
FIG. 4 is a schematic view of an operation unit in the embodiment.
Figure 5:
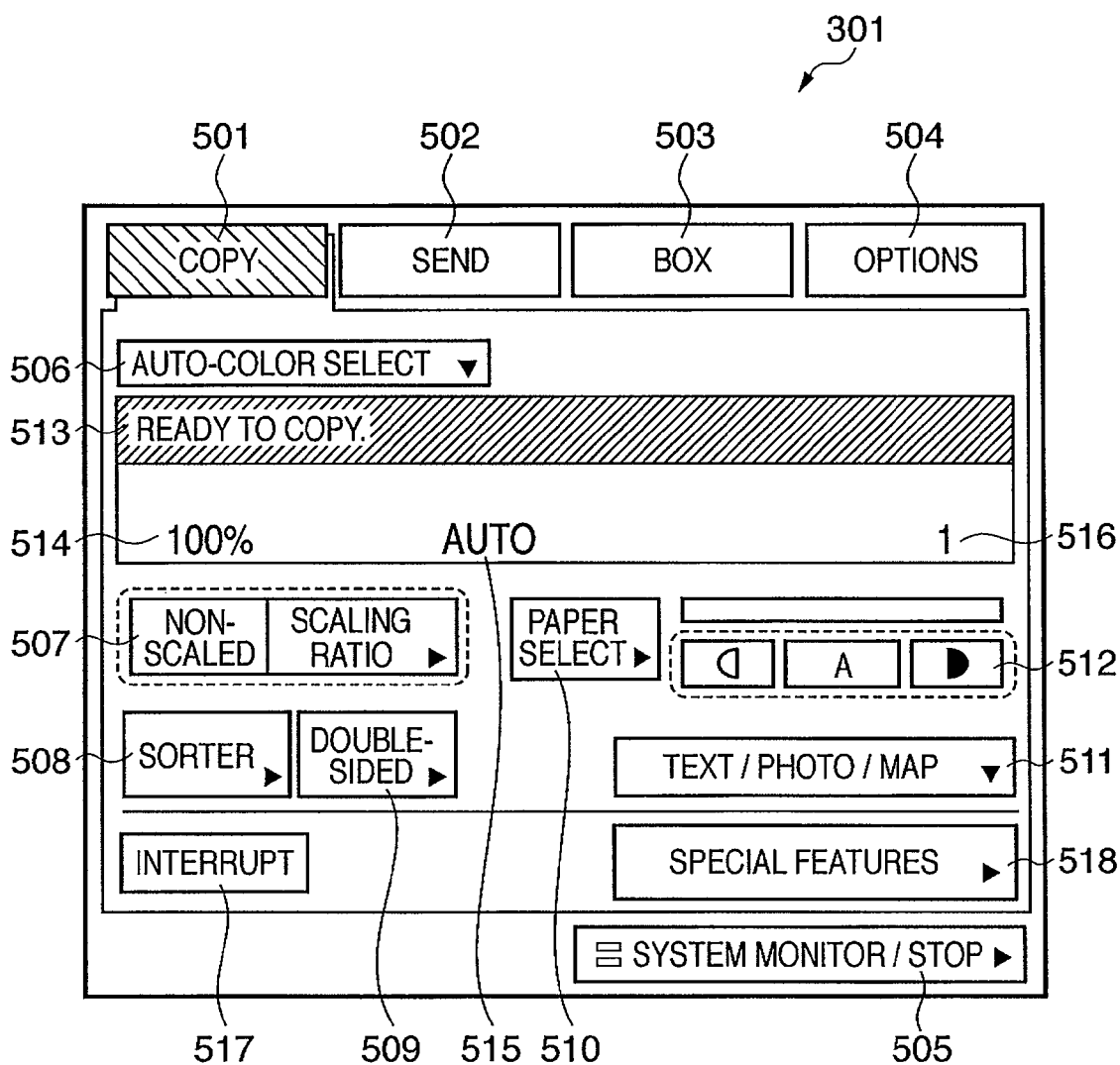
FIG. 5 is a view showing an example of a touch panel section 301 in the embodiment.

FIG. 4 is a schematic view showing an example of the operation unit 102 of the printing system 100. The operation unit 102 comprises a key input section 302 and touch panel section 301. FIG. 5 is a schematic view showing details of the touch panel section 301. The key input section 302 is not directly related to operations in the embodiment, so a detailed description thereof will be omitted. An example of the touch panel section 301 associated with operations in the embodiment will be explained in detail with reference to FIG. 5.

The touch panel section 301 has a touch panel display made up of an LCD (Liquid Crystal Display) and a transparent electrode adhered onto the LCD. It is programmed in advance to, when the user touches with his finger a transparent electrode corresponding to a key displayed on the LCD, detect the touch of the user and display another operation screen. FIG. 5 shows an initial screen in the standby mode. The touch panel section 301 can display various operation screens in accordance with setting operations.

In FIG. 5, a copy tab 501 is a tab key for transition to a copy operation screen. A send tab 502 is a tab key for transition to an operation screen to designate a send operation such as FAX transmission or E-mail sending. A mail box tab 503 is a tab key for transition to an operation screen to input/output a job to a box (corresponding to storage means for storing jobs for each user). An option tab 504 is a tab key for transition to an operation screen to set optional functions such as scanner setting. A system monitor key 505 is used to display the MFP state and status. By selecting one of the keys 501 to 505, the initial screen can be transited to a screen in a corresponding operation mode.

FIG. 5 shows an example of an operation screen when the copy tab 501 is selected. In this operation screen, a color select setting key 506 is used to select color copying, monochrome copying, or auto selection in advance. A scaling ratio setting key 507 is used to transit to a screen for setting the copy ratio such as non-scaled copying, enlargement, or reduction. A post-processing setting key 508 is used to transit to a screen for setting whether to execute stapling, punching, or the like, and the number and positions of staples or punches. A double-sided setting key 509 is used to transit to a screen for selecting single-sided or double-sided printing. A sheet size setting key 510 is used to transit to a screen for selecting a feeding stage, sheet size, and medium type. An image mode setting key 511 is used to select an image mode (for example, text mode or photo mode) suitable for a document image. A density setting key 512 is used to adjust, for example, increase or decrease the density of an output image.

A status display portion 513 displays a simple status such as standby, warm-up, jam, or error. A scaling ratio display portion 514 displays a scaling ratio set with the scaling ratio setting key 507. A sheet size display portion 515 displays a sheet size or the like set with the sheet size setting key 510. A sheet count display portion 516 displays the number of copies designated with a ten-key pad 405, or displays the number of a sheet during printing. An interrupt key 517 is used to execute another job during copying. A special features key 518 is used to transit to a screen for making settings such as various image processes and layouts including continuous page copying, cover/sheet insertion, N in 1 copying, and image movement. The control unit 108 controls to be able to accept print processing conditions of a target job from the user via the display unit.

Each key functions as a button capable of inputting an instruction.

<Operation Example of Printing System According to Embodiment>

(Description of Outline of Operation of Printing System)

Various control operations to print jobs accepted by the printing system 100 having the above-described configuration in the embodiment will be described in detail.

According to a job processing method in the embodiment, when a suspension factor occurs, the current job is suspended, and printing by a job other than the suspended current job is permitted during the suspension of the current job. After the suspension factor is removed, the operator is prompted to select how to resume processing of the suspended job. In the embodiment, the control unit 108 mainly executes, in accordance with flowcharts shown in FIGS. 14 to 22, control for executing a job operation, and display control concerning a display used for the control.

Upon accepting a request to execute printing of a target job, the control unit 108 controls the printing apparatus main body 101 to be able to execute the print operation of the job. The control unit 108 accepts a request from the operator via the operation unit 102 of the printing apparatus main body 101 to print the print data of a job read by the reader unit 103 of the printing apparatus main body 101.

With the box function of the embodiment, document image data of a job from the reader unit 103 or document image data of a job accepted from an external apparatus via the computer interface unit 106 that is saved in the HDD of the backup memory 109 is printed. The control unit 108 also accepts a request from the operator via the operation unit 102 to print the print data of a job using the box function.

Assume that the control unit 108 accepts a request from the operator via the operation unit 102 to execute printing of a target job. In this case, the control unit 108 controls the printing system 100 to execute a series of print operations for the job under print processing conditions set by the operator for the job via the operation unit 102 when the print execution request is input.

On the other hand, assume that the control unit 108 accepts a request from the operator of an external apparatus such as the server computer 200 in FIG. 2A via the UI unit of the external apparatus to execute printing of a target job. In this case, the control unit 108 also accepts print processing condition data of the target job via the computer interface unit 106 together with print data of the job. Upon receiving the print execution request from the external apparatus, the control unit 108 controls the printing system 100 to execute a series of print operations for the job under print processing conditions set via the UI unit of the external apparatus.

(Operation Example in Auto-Promote of Printing System)

Figure 6C:
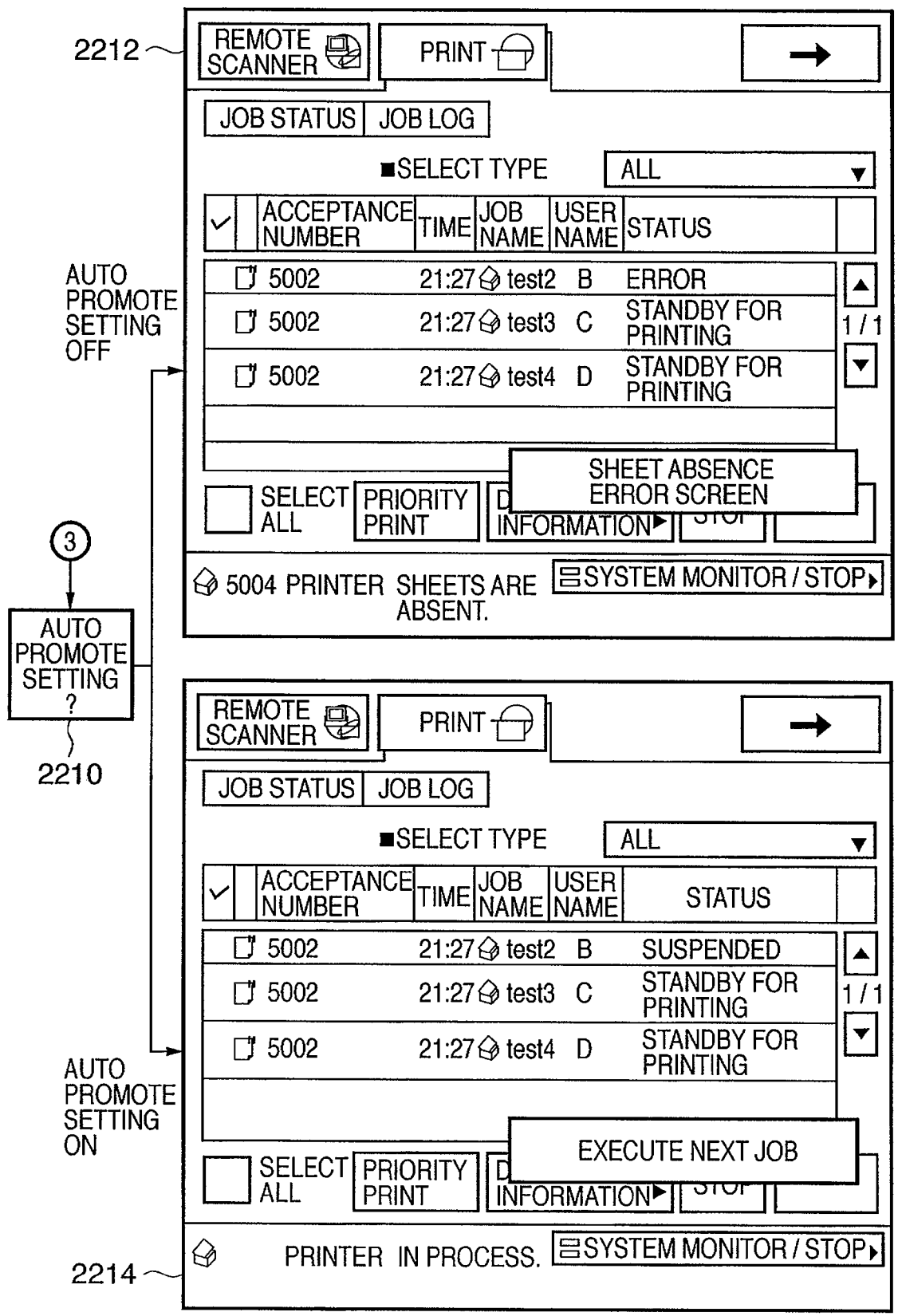

FIGS. 6A-6C show a concrete example of auto-promote in the embodiment.

Assume that there are jobs test1 to test4, and a job test1 is on printing, as represented by reference numeral 2222 in FIG. 6A. When printing of the job test1 ends at reference numeral 2202 in FIG. 6A and the printing of the next job test2 is to be executed, it is checked whether sheets necessary for the next job test2 are present or absent in the printing apparatus main body 101, as represented by reference numeral 2204 in FIG. 6A. If it is determined that necessary sheets are present, the next job test2 is executed.

If sheets run out during execution of the job test2, a sheet absence error screen appears as represented by reference numeral 2206 in FIG. 6B. If the job test2 ends without running out of sheets, execution of the next job test3 starts as represented by reference numeral 2208 in FIG. 6B.

If it is determined in 2204 of FIG. 6A that sheets necessary for the next job test2 are absent, it is determined whether or not auto-promote is set as represented by reference numeral 2210 in FIG. 6C. If it is determined that the auto-promote setting is OFF, a sheet absence error screen appears as represented by reference numeral 2212 in FIG. 6C.

If it is determined in 2210 of FIG. 6C that the auto-promote setting is ON, the state of the job test2 changes to the suspended state upon the lapse of a predetermined transition time, as represented by reference numeral 2214 in FIG. 6C. Then, the printing of the next job test3 starts.

In the embodiment, the auto-promote means an operation in which, when sheets necessary for a first job are absent at the start of the first job, the first job is suspended and the next job is executed first when the next job is executable. In the embodiment, suspending a job is represented as transition (of the job) to the suspended state.

(Setting Example 1 of Auto-Promote)

Figure 7A:
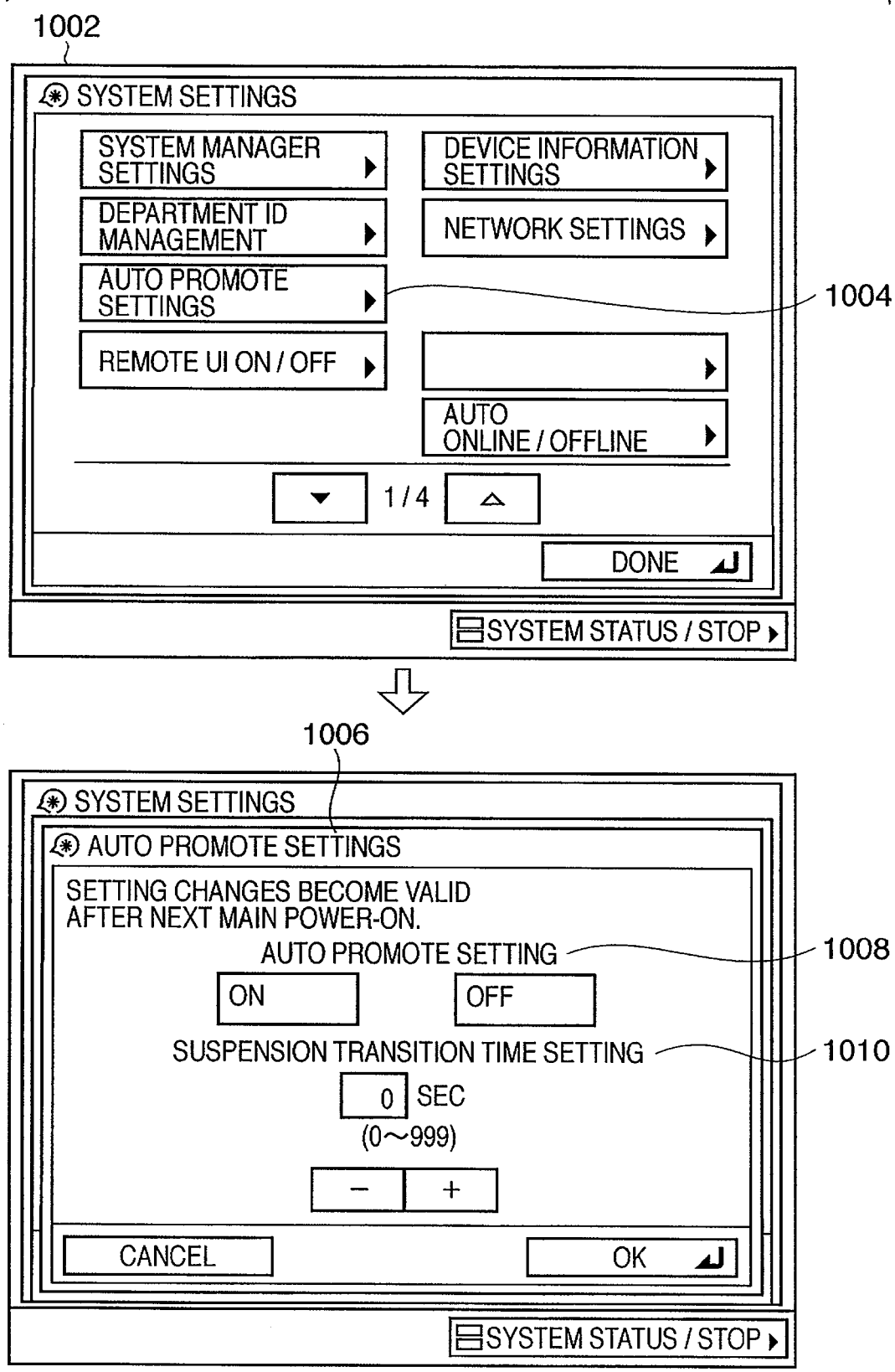
FIG. 7A is a view showing an example of setting automatic promotion in the embodiment.

FIG. 7A shows a setting example of auto-promote in the embodiment.

Auto-promote setting 1004 is selected in a setting items screen 1002. ON/OFF of the auto-promote setting is selected at an auto-promote setting area 1008 in an auto-promote setting screen 1006.

If ON is selected at the auto-promote setting area 1008, the time till transition to the suspended state is set at a suspension transition time setting area 1010. The user has made this auto-promote setting in advance.

(Example of Suspension Processing Procedures Based on Setting Example 1)

Figure 14A:
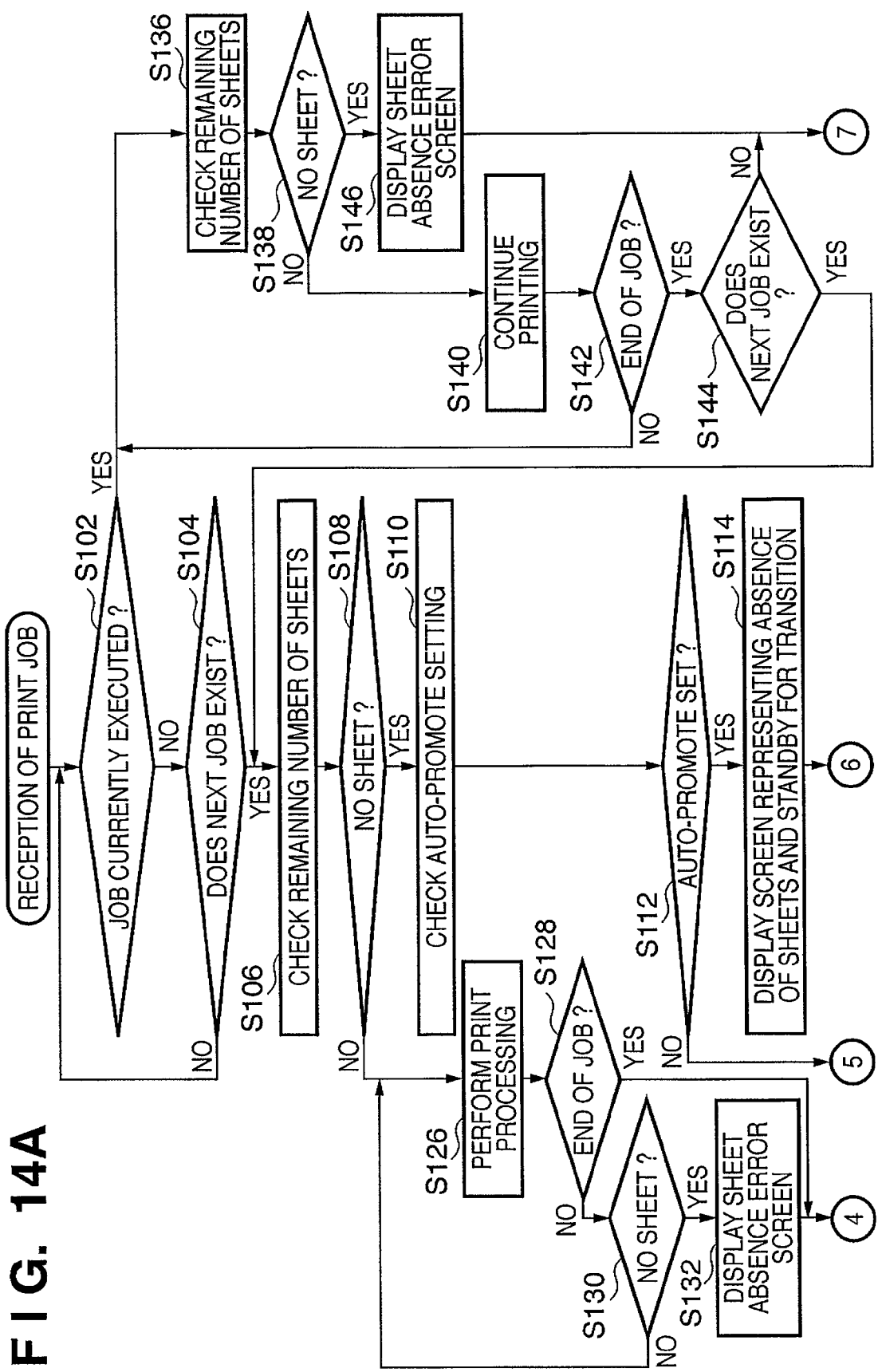
FIGS. 14A and 14B are a flowchart showing a sequence of basic processing of print job management and control in the embodiment.
Figure 14B:
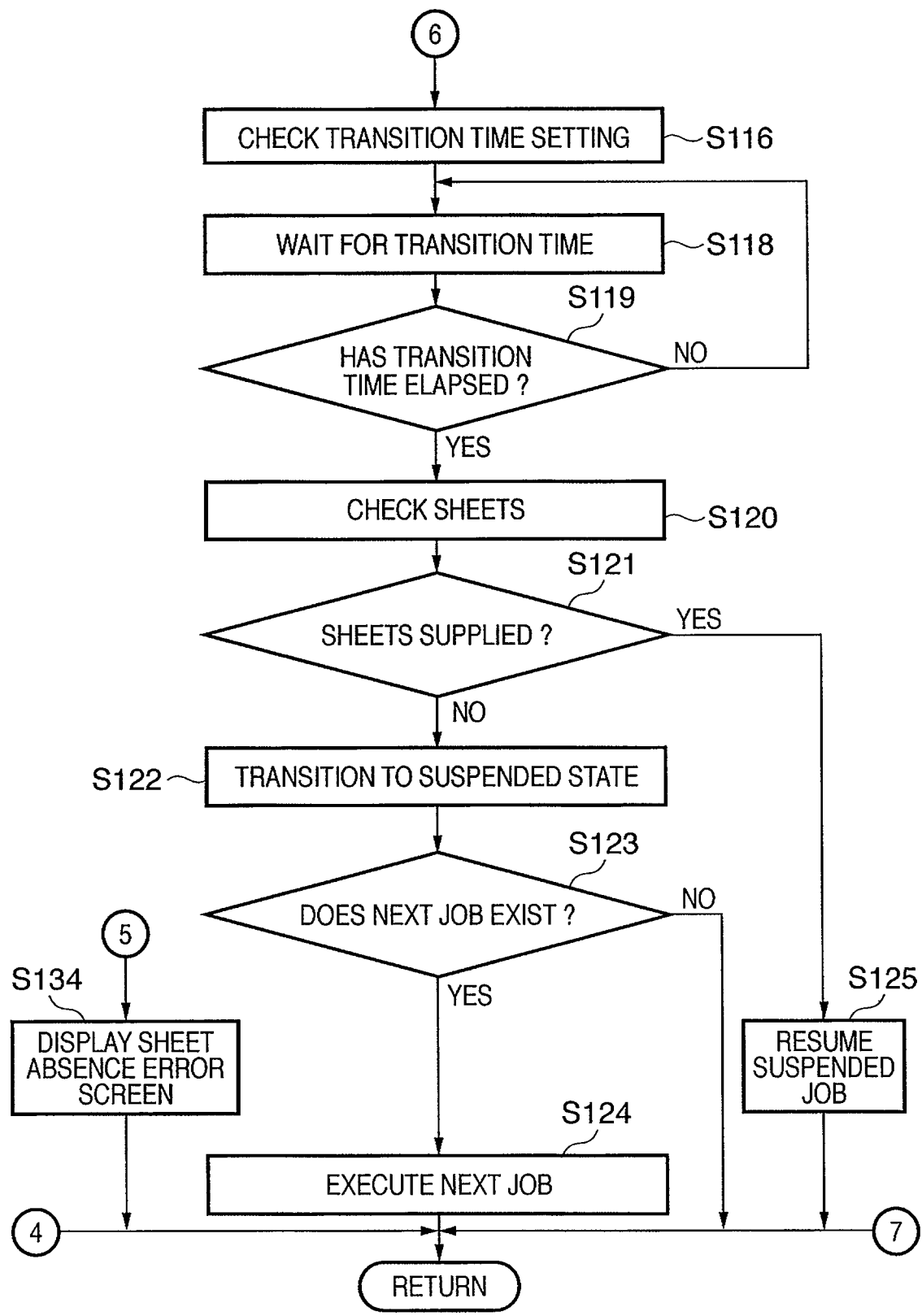

FIGS. 14A and 14B are a flowchart showing the sequence of basic processing concerning setting of the time till transition to the suspended state of a job and execution of a next job following the job transited to the suspended state in the embodiment. The flowchart in FIGS. 14A and 14B may be executed by the CPU 111 at a predetermined time interval or when an event such as reception of a new print job or detection of an error status occurs.

In step S102, it is determined whether or not any print job is currently executed. If it is determined that a job is currently executed, the process proceeds to step S136 to check the remaining number of sheets. If it is determined in step S138 that no sheet is present, the process proceeds to step S146 to display a sheet absence error screen. Then, the process ends. If it is determined in step S138 that sheets are present, the process proceeds to step S140 to continue printing.

In step S142, it is determined whether or not the printing of the job has ended. If it is determined that the printing of the job has not ended, the process returns to step S136 to repeat print processing. If it is determined that the printing of the job has ended, it is determined in step S144 whether or not the next print job exists. If it is determined in step S144 that no next print job exists, the process ends. If it is determined in step S144 that the next print job exists, the process proceeds to step S106.

If it is determined in step S102 that no job is currently executed, the process proceeds to step S104 to determine whether or not the next print job exists. If it is determined that no next print job exists, the process returns to step S102. If it is determined in step S104 that the next print job exists, the process proceeds to step S106 to check the remaining number of sheets.

If it is determined in step S108 that sheets are present, the process proceeds to step S126 to start print processing of the next print job. In step S128, it is determined whether or not the printing of the job has ended. If it is determined that the printing of the job has not ended, it is determined in step S130 whether or not sheets are present. If it is determined that sheets are present, the process proceeds to step S126 to repeat print processing. If it is determined in step S130 that no sheet is present, the process proceeds to step S132 to display a sheet absence error screen. Then, the process ends. If it is determined in step S128 that the printing of the job has ended, the process ends.

If it is determined in step S108 that no sheet is present, the process proceeds to step S110 to check the auto-promote setting. In step S112, it is determined whether or not auto-promote is set. If it is determined that the auto-promote is not set, the process proceeds to step S134 to display a sheet absence error screen. Then, the process ends.

If it is determined in step S112 that the auto-promote is set, a warning that an error has occurred is informed to the user, and a screen representing that sheets are absent and transition to the suspended state stands by is displayed.

Figure 8:
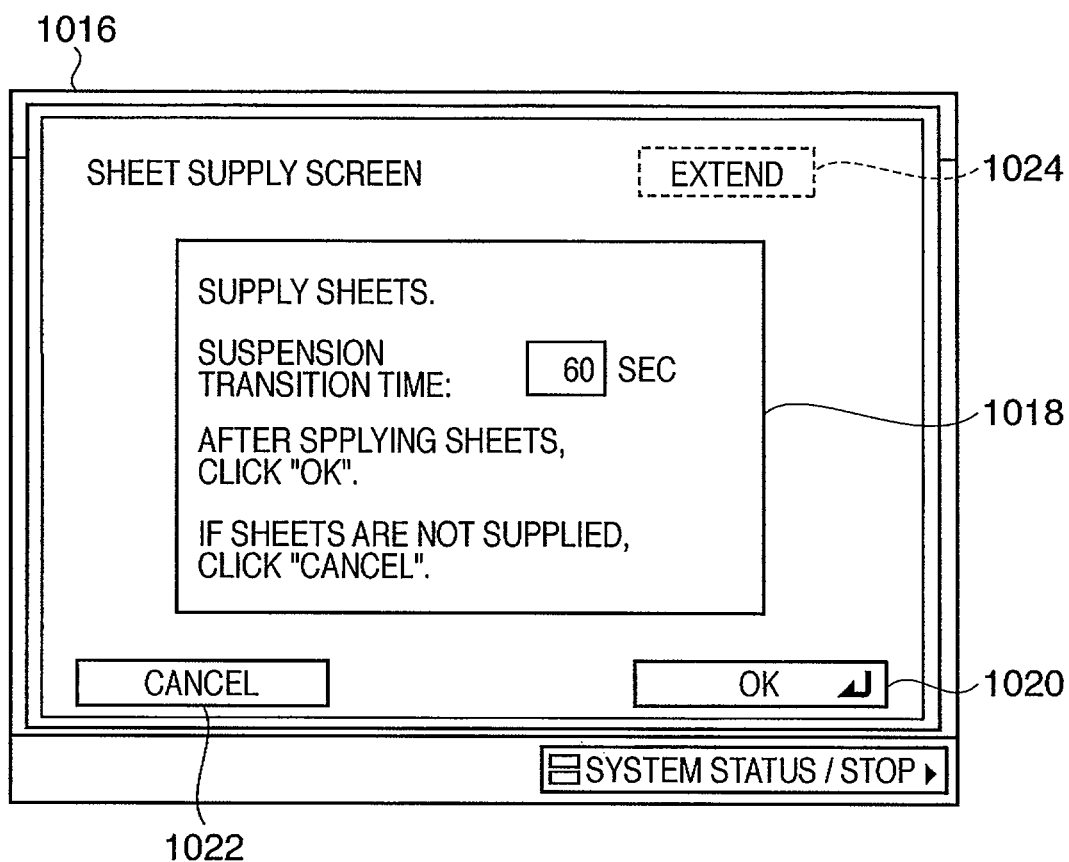
FIG. 8 is a view showing an example of the operation unit displaying that sheets are absent and transiting a current job to the suspended state stands by in the embodiment.

FIG. 8 shows an example of a display screen 1016 representing that transition to the suspended state stands by. An area 1018 displays the necessity to supply sheets and the suspension transition time until a current job is transited to the suspended state. An OK button 1020 is used to continue the current job by inputting the end of supplying sheets during the suspension transition time. A cancel button 1022 is used to suspend the current job without supplying sheets. A extend button 1024 is an option to be described below, and designates extension of the suspension transition time. When sheets are absent, a print job list display screen may also display that sheets are absent and transition to the suspended state stands by, as shown not in FIG. 8 but shown in FIG. 9.

The process proceeds to step S116 to check the transition time setting. In step S118, the process waits for predetermined time. In step S119, it is determined whether or not the transition time has elapsed. If it is determined that the transition time has not elapsed, the process returns to step S118 and keeps waiting.

If it is determined in step S119 that the transition time has elapsed, it is determined in step S120 whether or not sheets, which had been absent, have been supplied. If it is determined in step S121 that sheets have been supplied, the process proceeds to step S125 to resume printing based on the suspended current job. If it is determined in step S121 that sheet has not been supplied, the process proceeds to step S122 to transit the current job to the suspended state.

It is determined in step S123 whether or not the next job exists. If it is determined that no next job exists, the process ends. If it is determined that the next job exists, the process proceeds to step S124 to start executing the next job. Then, the process ends.

(Setting Example 2 of Auto-Promote)

FIG. 7B shows a setting example of the suspension transition time for each job type in the embodiment.

The auto-promote setting 1004 is selected in the setting item screen 1002. ON/OFF of the auto-promote is set for each job type at a job type-specific auto-promote setting area 1014 in an auto-promote setting screen 1012. If the auto-promote setting is ON, the suspension transition time is set for each job type. The user has made this auto-promote setting in advance.

The job type includes a copy job, a print job, a print job from a box, a FAX reception job and the like.

(Example of Suspend Processing Procedures Based on Setting Example 2)

Figure 15:
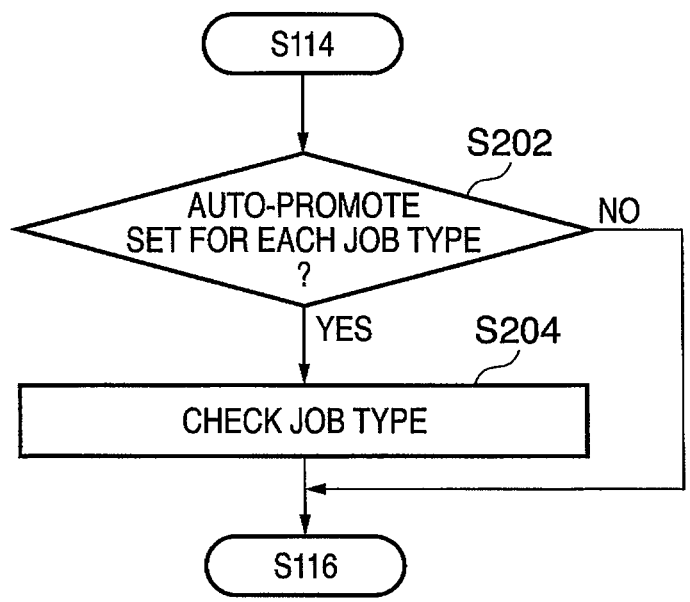
FIG. 15 is a flowchart showing a sequence when setting the time before transiting a current job to the suspended state for each job type in the embodiment.

FIG. 15 is a flowchart showing a sequence when setting the suspension transition time for each job type in the embodiment. The sequence setting the suspension transition time for each job type is obtained by inserting the sequence shown in FIG. 15 between steps S114 and S116 in FIGS. 14A and 14B. Since the sequence in FIGS. 14A and 14B has already been described, the description thereof will not be repeated.

After it is displayed in step S114 of FIG. 14A that sheets are absent and the process waits for the suspension transition time, it is determined in step S202 whether or not auto-promote is set for each job type. If it is determined in step S202 that the auto-promote is not set for each job type, the process proceeds to step S116 in FIG. 14B to set the default transition time in setting example 1 described above.

If it is determined in step S202 that the auto-promote is set for each job type, the type of current job is checked in step S204. In step S116 of FIG. 14B, the suspension transition time for the job type is checked, and the process waits for the suspension transition time for the job type in steps S118 and S119.

(Example of Extending Suspension Transition Time)

Figure 16:
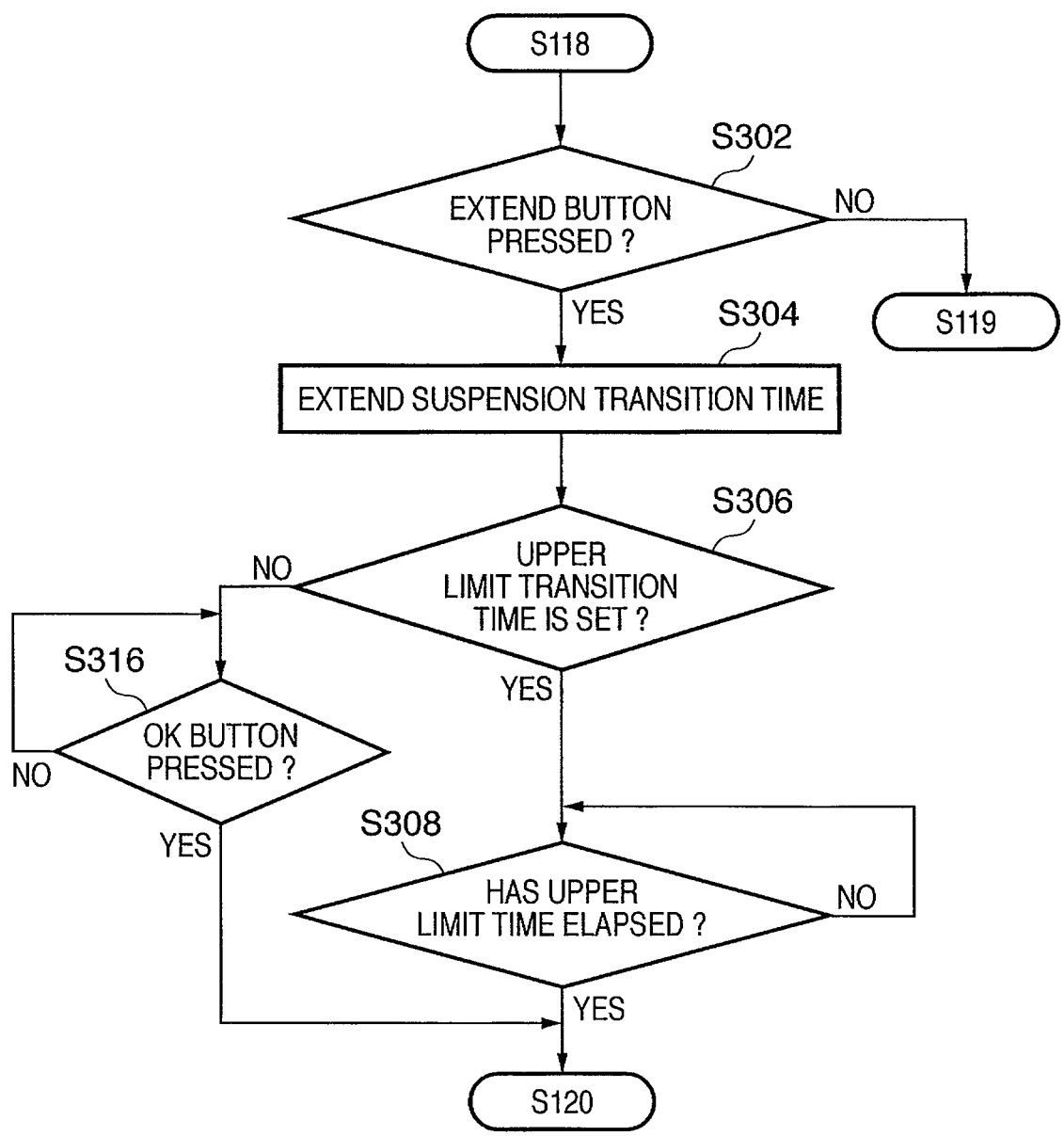
FIG. 16 is a flowchart showing a sequence when extending the time before transiting a current job to the suspended state in the embodiment.

FIG. 16 is a flowchart showing a sequence when extending the suspension transition time in the embodiment. The sequence extending the suspension transition time is obtained by inserting the following sequence of FIG. 16 between steps S118 and S120 in FIG. 14B. Since the sequence in FIGS. 14A and 14B has already been described, the description thereof will not be repeated.

FIG. 9 shows a display example of a button for extending the suspension transition time in the operation unit 102. In FIG. 9, a print job 1028 stands by for suspension in a print job list screen 1026. A sheet supply screen 1032 displays a sheet supply message area 1034, an OK button 1036 pressed after the end of sheets supply, and a cancel button 1038 pressed when no sheet will been supplied.

After the process waits for the predetermined time in step S118 of FIG. 14B, it is determined in step S302 whether or not the user has pressed an extend button 1030 in FIG. 9. If it is determined that the user has not pressed the extend button 1030, the process proceeds to step S119 in FIG. 14B.

If it is determined in step S302 that the user has pressed the extend button 1030, the process proceeds to step S304 to extend the suspension transition time. In step S306, it is determined from the upper limit transition time setting flag 109e whether or not an upper limit value is set for extending the suspension transition time. If it is determined that the upper limit value is not set for extending the suspension transition time, the process proceeds to step S316 to determine whether or not the user has pressed the OK button 1036. If it is determined in step S316 that the user has not pressed the OK button 1036, the process repeats in step S316. If it is determined in step S316 that the user has pressed the OK button 1036, the process proceeds to step S120 in FIG. 14B to check sheets. In the case of S316, the suspension transition time is extended without limitation till the OK button 1036 has been pressed.

If it is determined in step S306 that an upper limit value is set for extending the suspension transition time, the process proceeds to step S308 to determine whether or not the suspension transition time extended to the upper limit has elapsed. If it is determined in step S308 that the extended suspension transition time has not elapsed, the process repeats in step S308. If it is determined that the extended suspension transition time has elapsed, the process proceeds to step S120 in FIG. 14B to check sheets. In the case of S308, the suspension transition time is extended to the upper limit value.

Subsequently, if it is determined in step S121 of FIG. 14B that sheets have been supplied, the suspended current job is resumed in step S125.

In this example, the extended suspension transition time has an upper limit or is unlimited. Alternatively, the suspension transition time may also be extended by a predetermined time every time the extend button 1030 is pressed.

(Resume Example 1 of Suspended Print Job)

Figure 17:
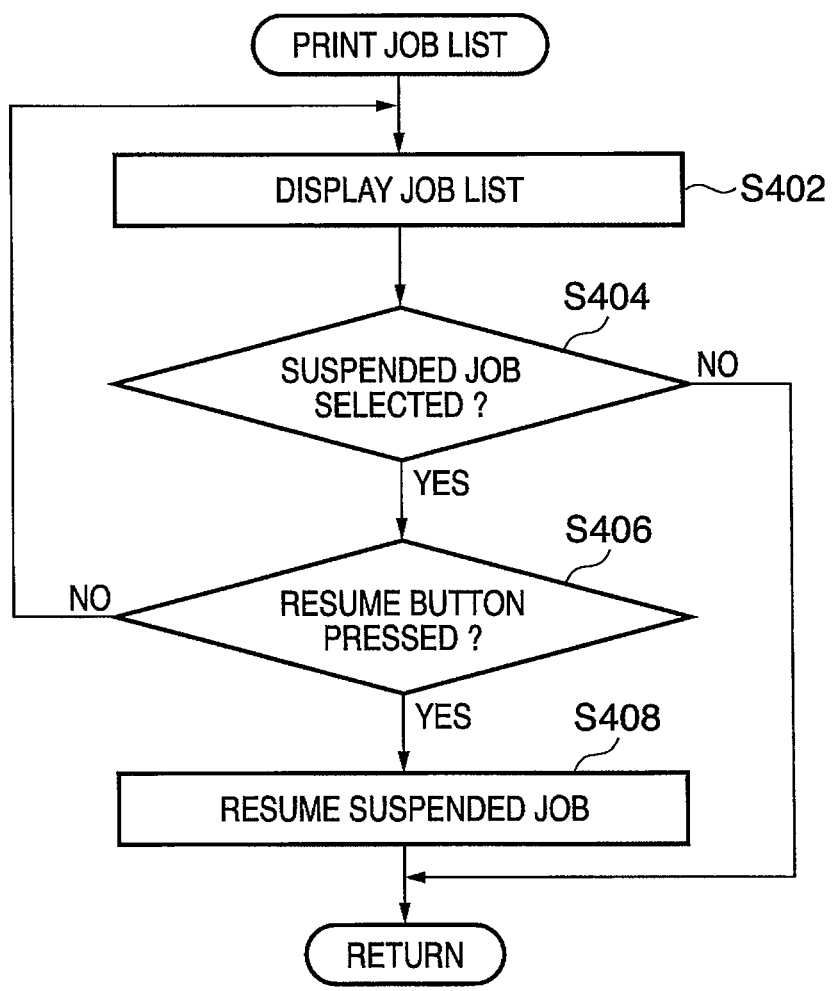
FIG. 17 is a flowchart showing a sequence when resuming a suspended job in the embodiment.

FIG. 17 is a flowchart showing a sequence when resuming a suspended job in the embodiment. FIG. 10 shows an example of a button for resuming a suspended job on the operation unit 102. A print job 1042 to be resumed is selected from a print job list screen 1040 in FIG. 10. By pressing a resume button 1044, processing of the print job 1042 is resumed.

When the user instructs display of a print job list, the print job list is displayed in step S402. In step S404, it is determined whether or not the user has selected a suspended job. If it is determined in step S404 that the user has not selected any suspended jobs, the process ends.

If it is determined that the user has selected a suspended job, it is determined in step S406 whether or not the user has pressed the resume button 1044. If it is determined in step S406 that the user has not pressed the resume button 1044, the process returns to step S402 and the process is repeated. If it is determined in step S406 that the user has pressed the resume button 1044, the process proceeds to step S408 to resume the processing of the selected suspended job. Then, the process ends.

(Resume Example 2 of Suspended Print Job)

Figure 18:
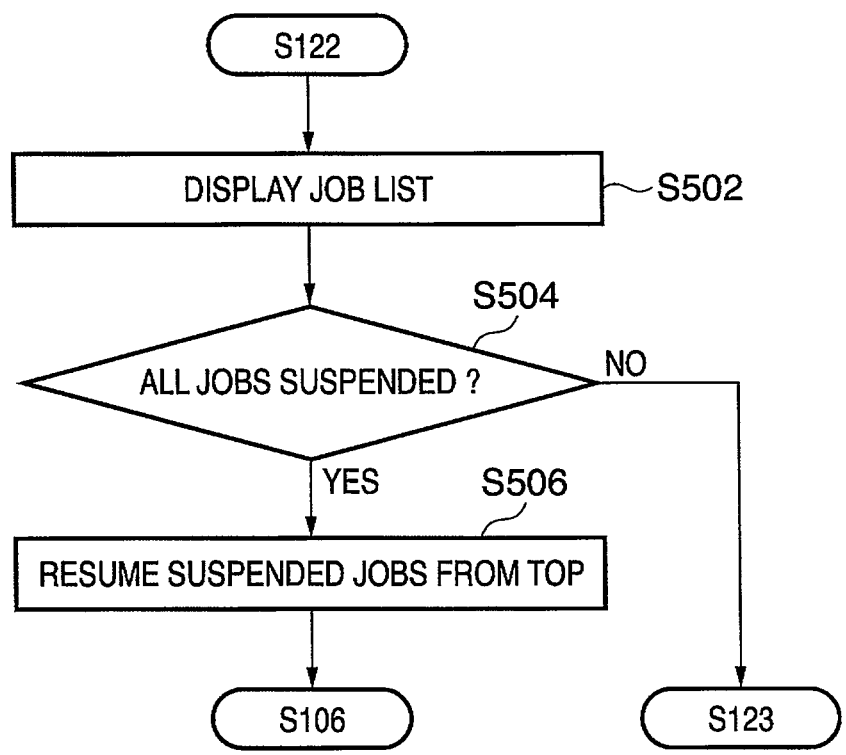
FIG. 18 is a flowchart showing a sequence when automatically resuming a suspended job in the embodiment.

FIG. 18 is a flowchart showing a sequence when automatically resuming a suspended job after all jobs in a job list have been suspended in the embodiment. The sequence of automatically resuming a suspended job after all jobs have been suspended is obtained by inserting the sequence shown in FIG. 18 between steps S122 and S123 in FIG. 14B. Since the sequence in FIGS. 14A and 14B has already been described, a description thereof will not be repeated.

After the current job has been transited to the suspended state in step S122 of FIG. 14B, a job list is displayed in step S502. In step S504, it is determined whether or not all jobs in the job list have been suspended.

If it is determined in step S504 that not all jobs in the job list have been suspended, the process proceeds to step S123 in FIG. 14B to start printing as long as the next printable job exists. If it is determined in step S504 that all jobs in the job list have been suspended, the process proceeds to step S506 to try to resume the suspended job in the job list sequentially from the top of the list. For resuming the suspended job, the process proceeds to step S106 in FIG. 14A.

According to the embodiment, if there is a ready job for which supply of sheets has ended while jobs are sequentially suspended, printing of the ready job can resume.

(Resume Example 3 of Suspended Print Job)

Figure 19:
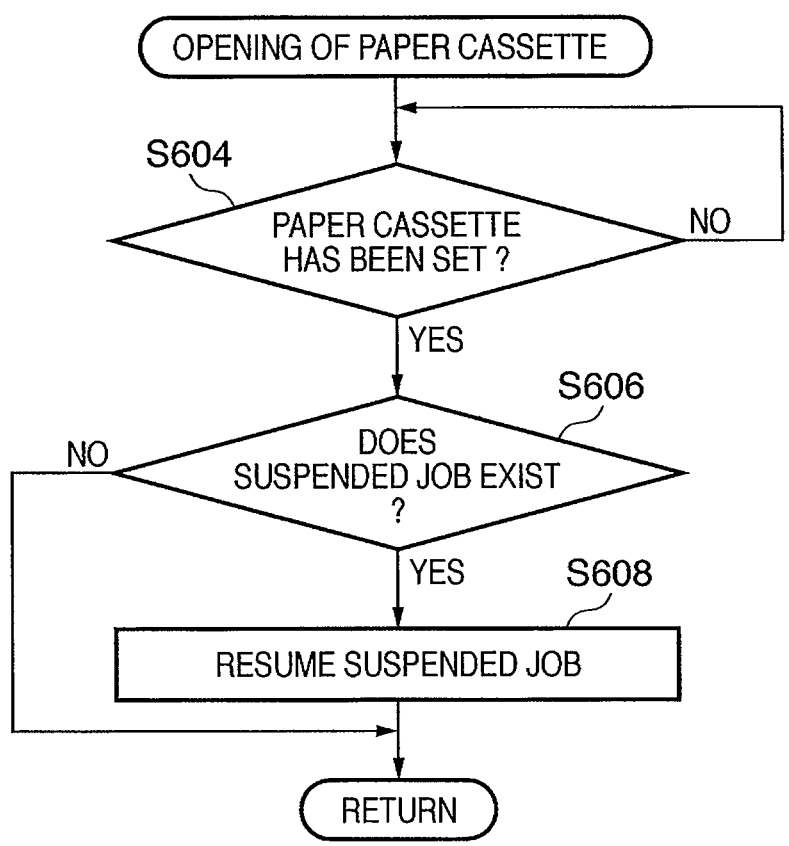
FIG. 19 is a flowchart showing a processing sequence when trying to resume a suspended job after setting a paper cassette again in the embodiment.

FIG. 19 is a flowchart showing a processing sequence when trying to resume a suspended job in response to pulling out a paper cassette and then setting the paper cassette again in the embodiment. The sequence in the flowchart of FIG. 19 starts when any paper cassette is opened.

In step S604, it is determined whether or not the opened paper cassette has been set again (closed). If it is determined in step S604 that the opened paper cassette has not been set again, the process repeats in step S604. If it is determined that the opened paper cassette has been set again, the process proceeds to step S606 to determine whether or not suspended jobs exist in a job list.

If it is determined in step S606 that no suspended job exists in the job list, the process ends. If it is determined that suspended jobs exist, the process proceeds to step S608 to try to resume the suspended jobs in the job list sequentially from the top of the suspended jobs. Then, the process ends.

The sequence in the flowchart of FIG. 19 is an independent process. The process may also be controlled to return to step S106 in FIG. 14A after step S608.

(Resume Example 4 of Suspended Print Job)

FIG. 20 is a flowchart showing a processing sequence in the embodiment when trying to resume a suspended job after, when a paper cassette is pulled out and set again, supplied sheets are checked and it is determined that the supplied sheets are for the suspended job. The sequence of determining whether or not necessary sheets have been supplied is obtained by changing the process in step S608 of FIG. 19 into the sequence (represented by S608') in FIG. 20. Since the entire sequence in FIG. 19 has already been described, a description thereof will not be repeated.

Figure 11A:
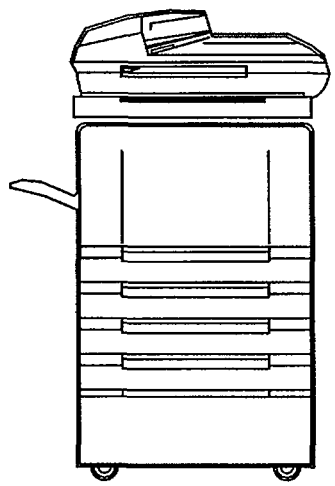

FIGS. 11A and 11B show a display example of the operation unit 102 in the embodiment. In FIG. 11B, a sheet size list 1043 represents sheet sizes designated by respective jobs. While all jobs are suspended, A3 sheets are supplied, as represented by reference numeral 1045 in FIG. 11A. The supplied sheets are checked as represented by reference numeral 1046 in FIG. 11A. Printing of a job test2 1048 waiting for supply of A3 sheets resumes in FIG. 11B.

After the paper cassette is supplied with sheets, if it is determined in step S606 of FIG. 19 that a suspended job exists, the process proceeds to step S708 to check supplied sheets, and to step S710. In step S710, the supplied sheets are compared with sheets necessary for the suspended job, and it is determined whether or not they are the same size of sheets. If these sheets are different, the process ends.

If it is determined in step S710 that the supplied sheets are same as sheets necessary for the suspended job, the process proceeds to step S712 to resume the suspended job requiring the supplied sheets. Then, the process ends.

(Display Operation Example 1 of Suspended Print Job)

Figure 21:
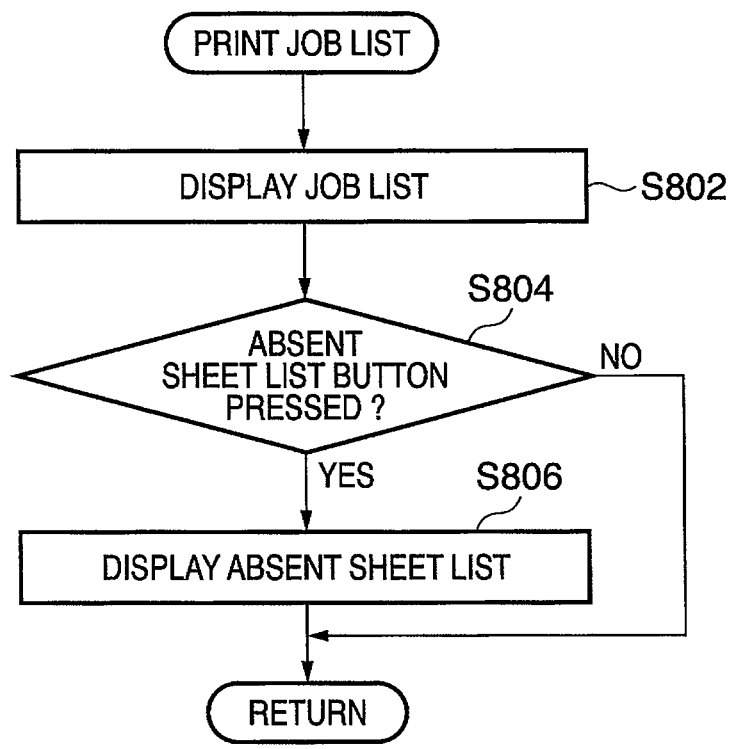
FIG. 21 is a flowchart showing a processing sequence when displaying a sheet list in the embodiment.

FIG. 21 is a flowchart showing a processing sequence when displaying a list of sheets necessary for suspended jobs in a job list in the embodiment.

FIGS. 12A and 12B show a display example of the operation unit 102 in the embodiment. By clicking an absent sheet list button 1050 in the print job list screen 1040 in FIG. 12A, a sheet list display 1052 appears to display sheets necessary for print jobs in FIG. 12B on the basis of the sheet size list 1043 of FIG. 12A. By clicking a sheet list button 1054 in the sheet list display 1052 in FIG. 12B, an absent sheet count display 1056 appears for sheets of each size. By clicking an OK button 1058 in the absent sheet count display 1056, the display returns to the sheet list display 1052. It is also possible to control to return a suspended job which becomes printable after supplying sheets, from the suspend state and resume printing of the returned job, when sheets are supplied and the OK button 1058 is clicked.

When the user instructs a display of the print job list, the job list is displayed in step S802. In step S804, it is determined whether or not the user has pressed the absent sheet list button 1050. If it is determined in step S804 that the user has not pressed the absent sheet list button 1050, the process ends. If it is determined in step S804 that the user has pressed the absent sheet list button 1050, the process proceeds to step S806.

In step S806, a size of sheet necessary for each of suspended jobs in the job list is displayed in the sheet list display 1052. Further, if the user presses the sheet list button 1054 in step S806, a list of sheets is displayed with a number of sheets necessary for each size of sheets.

(Display Operation Example 2 of Suspended Print Job)

Figure 22:
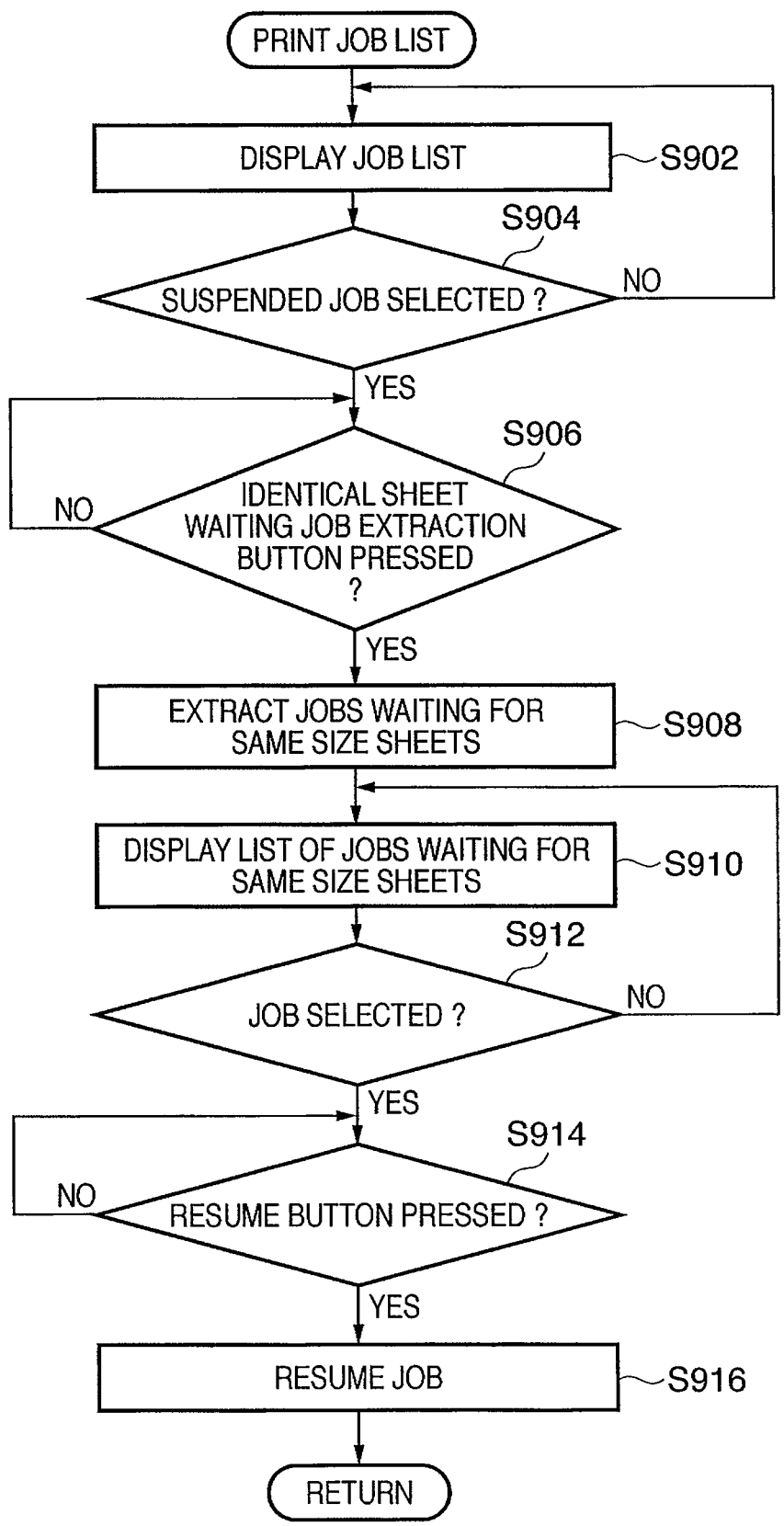
FIG. 22 is a flowchart showing a processing sequence when displaying a list of suspended jobs waiting for the same sheets in the embodiment.

FIG. 22 is a flowchart showing a processing sequence when displaying a list of suspended jobs waiting for the same size of sheets.

Figure 13B:
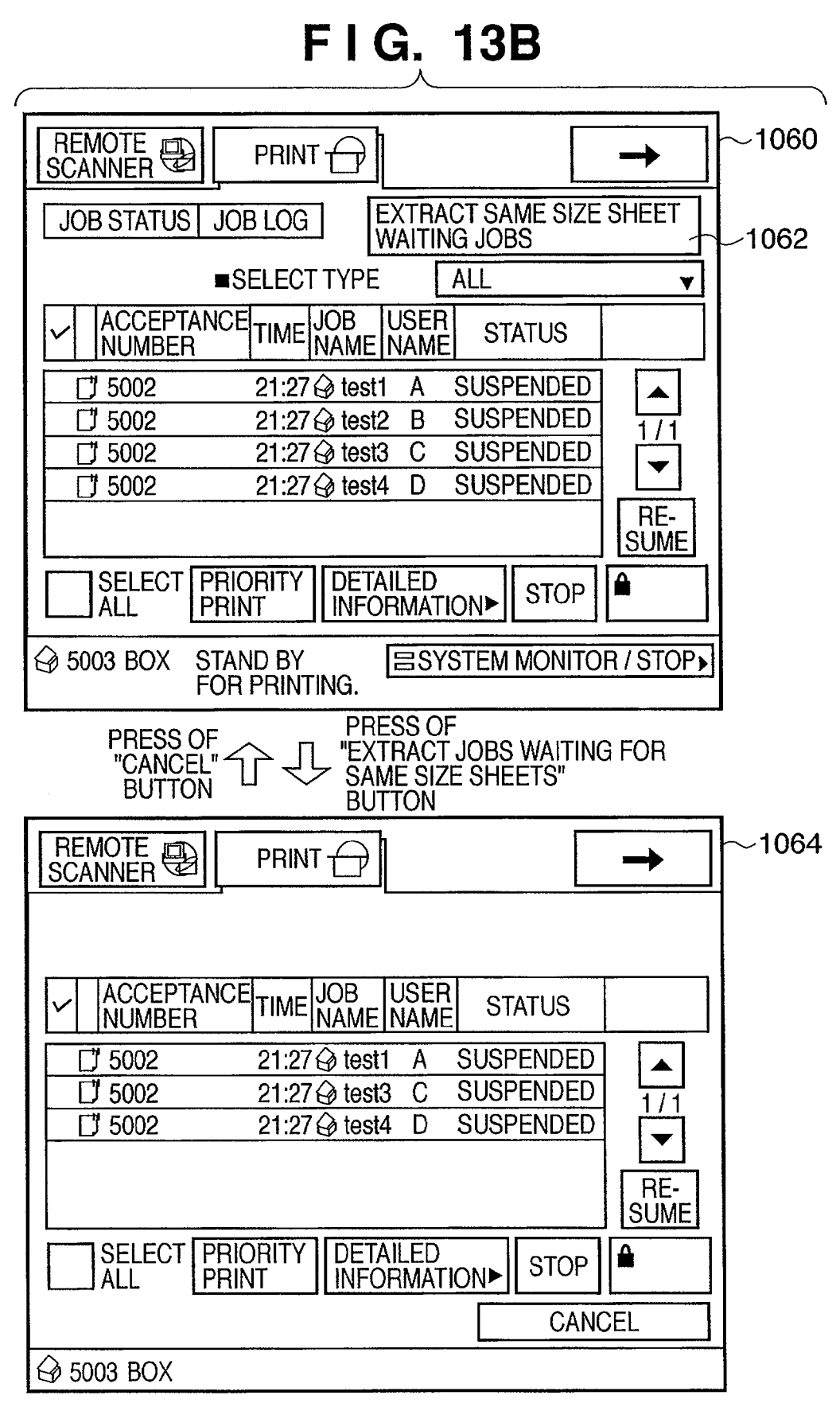

FIGS. 13A and 13B show a display example of the operation unit 102 in the embodiment. By selecting a print job (test1 in FIG. 13A) in the print job list screen 1040 in FIG. 13A, the print job list screen 1040 changes to a selection screen 1060 in FIG. 13B. By clicking a same size sheet waiting job extraction button 1062 in the selection screen 1060, suspended jobs waiting for the same sheets as those necessary for the selected print job test1 are extracted based on the sheet size list 1043 of FIG. 13A, and a list display 1064 appears. By selecting a job and clicking a resume button in the list display 1064, the selected job resumes. By clicking a cancel button, the list display 1064 returns to the selection screen 1060.

When the user instructs a display of the print job list, the job list is displayed in step S902. In step S904, it is determined whether or not the user has selected a suspended job in the job list. If it is determined that the user has not selected any suspended job, the process repeats in step S902.

If it is determined in step S904 that the user has selected a suspended job, the process proceeds to step S906 to determine whether or not the user has pressed the same size sheet waiting job extraction button 1062. If it is determined in step S906 that the user has not pressed the same size sheet waiting job extraction button 1062, the process repeats in step S906.

If it is determined that the user has pressed the same size sheet waiting job extraction button 1062, the process proceeds to step S908. In step S908, suspended jobs requiring the same sheets as those necessary for the suspended job selected from the job list are extracted. In step S910, a list of suspended jobs extracted in step S908 is displayed.

In step S912, it is repetitively determined whether or not the user has selected a suspended job in the list of suspended jobs waiting for the same size sheets displayed in step S910. If it is determined in step S912 that the user has selected a suspended job, the process proceeds to step S914 to determine whether or not the user has pressed the resume button. If it is determined in step S914 that the user has not pressed the resume button, the process repeats in step S914. If it is determined that the user has pressed the resume button, the process proceeds to step S916 to resume the suspended job selected in step S912. Then, the process ends.

Note that FIG. 22 does not show steps when the cancel button is pressed to keep the flowchart simple.

Other Embodiments

The embodiment has described an example of print job management and control based on determination of the presence/absence of sheets defined as consumables. However, even when the presence/absence of staples or toner as another example of consumables is determined, the same print job management and control are possible. The management and control in this case also fall within the scope of the present invention.

The present invention may also be applied to a system or integrated apparatus including a plurality of devices (for example, a host computer, interface device, and printer), or an apparatus formed by a single device.

The object of the present invention is also achieved by supplying a storage medium (or recording medium) which records software program codes for implementing the functions of the above-described embodiment to a system or apparatus, and reading out and executing program codes stored in the storage medium by the computer (or the CPU or MPU) of the system or apparatus.

In this case, the program codes read out from the storage medium implement the functions of the above-described embodiment, and the storage medium which stores the program codes constitutes the present invention.

The functions of the above-described embodiment are implemented when the computer executes the readout program codes. Also, the present invention includes a case where an OS (Operating System) or the like running on the computer performs some or all of actual processes on the basis of the instructions of the program codes and thereby implements the functions of the above-described embodiments.

Furthermore, the present invention includes a case where, after the program codes read out from the storage medium are written in the memory of a function expansion card inserted into the computer or the memory of a function expansion unit connected to the computer, the CPU of the function expansion card or function expansion unit performs some or all of actual processes on the basis of the instructions of the program codes and thereby implements the functions of the above-described embodiment.

When the present invention is applied to the storage medium, the storage medium stores program codes corresponding to the above-described flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-022240, filed on Jan. 31, 2007, which is hereby incorporated by reference herein in its entirety.

What is claimed is:

1. An image forming apparatus comprising:
   an input unit adapted to input a plurality of jobs including a first job and a second job that is input following the first job;
   a control unit adapted to control to execute the first job prior to the second job in the case that the image forming apparatus has consumables used to execute the first job, and to execute the second job prior to the first job in the case that the image forming apparatus does not have consumables used to execute the first job; and
   a setting unit adapted to set for each job type whether or not another job may be executed prior to a job in the case that the image forming apparatus does not have consumables used to execute a job;
   wherein the control unit controls, in the case that the image forming apparatus does not have consumables used to execute the first job, to execute the second job prior to the first job if the setting unit set for a job type corresponding to the first job that another job may be executed prior to a job, and not to execute the second job prior to the first job if the setting unit set for a job type corresponding to the first job that another job may not be executed prior to a job,
   wherein the job type includes a copy job, a print job, and a FAX reception job.

2. An image forming apparatus comprising:
   an input unit adapted to input a plurality of jobs including a first job and a second job that is input following the first job;
   a control unit adapted to control to execute the first job prior to the second job in the case that the image forming apparatus has consumables used to execute the first job, and to execute the second job prior to the first job in the case that the image forming apparatus does not have consumables used to execute the first job; and
   a setting unit adapted to perform a setting for each job type a predetermined time;
   wherein the control unit controls, in the case that the image forming apparatus does not have consumables used to execute the first job, to execute the second job prior to the first job after the predetermined time set for a job type corresponding to the first job has elapsed,
   wherein the job type includes a copy job, a print job, and a FAX reception job.

3. An image forming apparatus comprising:
   an input unit adapted to input a plurality of jobs including a first job and a second job that is input following the first job;
   a control unit adapted to control to execute the first job prior to the second job in the case that the image forming apparatus has consumables used to execute the first job, and to execute the second job prior to the first job after a predetermined time has elapsed in the case that the image forming apparatus does not have consumables used to execute the first job; and
   a receive unit adapted to receive, while waiting for elapse of the predetermined time, an instruction from a user to inhibit executing the second job prior to the first job after a predetermined time has elapsed;
   wherein the control unit controls, in the case that the image forming apparatus does not have consumables used to execute the first job and the receive unit has received the instruction, not to execute the second job prior to the first job after the predetermined time has elapsed.

4. The image forming apparatus according to claim 3, wherein the control unit controls, in the case that the image forming apparatus does not have consumables used to execute the first job and the receive unit has received the instruction, to execute the second job prior to the first job after a time longer than the predetermined time has elapsed.

5. The image forming apparatus according to claim 3, wherein the control unit controls, in the case that the image forming apparatus does not have consumables used to execute the first job and the receive unit has received the instruction, to execute the second job prior to the first job in response to receiving an instruction from a user to permit executing the second job prior to the first job.

6. A control method of an image forming apparatus comprising steps of:
   inputting a plurality of jobs including a first job and a second job that is input following the first job;
   controlling to execute the first job prior to the second job in the case that the image forming apparatus has consumables used to execute the first job, and controlling to execute the second job prior to the first job in the case that the image forming apparatus does not have consumables used to execute the first job; and
   performing a setting for each job type whether or not another job may be executed prior to a job in the case that the image forming apparatus does not have consumables used to execute a job;
   wherein, in the case that the image forming apparatus does not have consumables used to execute the first job, a control is performed in the controlling step to execute the second job prior to the first job if a setting is performed in the step of performing a setting for a job type corresponding to the first job that another job may be executed prior to a job, and not to execute the second job prior to the first job if a setting is performed in the step of performing a setting for a job type corresponding to the first job that another job may not be executed prior to a job,
   wherein the job type includes a copy job, a print job, and a FAX reception job.

7. A control method of an image forming apparatus comprising steps of:
   inputting a plurality of jobs including a first job and a second job that is input following the first job;
   controlling to execute the first job prior to the second job in the case that the image forming apparatus has consumables used to execute the first job, and controlling to execute the second job prior to the first job in the case that the image forming apparatus does not have consumables used to execute the first job; and
   performing a setting for each job type a predetermined time;
   wherein, in the case that the image forming apparatus does not have consumables used to execute the first job, a control is performed in the controlling step to execute the second job prior to the first job after the predetermined time set for a job type corresponding to the first job has elapsed,
   wherein the job type includes a copy job, a print job, and a FAX reception job.

8. A control method of an image forming apparatus comprising steps of:
   inputting a plurality of jobs including a first job and a second job that is input following the first job;

controlling to execute the first job prior to the second job in the case that the image forming apparatus has consumables used to execute the first job, and controlling to execute the second job prior to the first job after a predetermined time has elapsed in the case that the image forming apparatus does not have consumables used to execute the first job; and receiving, while waiting for elapse of the predetermined time, an instruction from a user to inhibit executing the second job prior to the first job after a predetermined time has elapsed;

wherein, in the case that the image forming apparatus does not have consumables used to execute the first job and the instruction has been received in the receiving step, a control is performed in the controlling step, not to execute the second job prior to the first job after the predetermined time has elapsed.

9. A non-transitory computer-readable storage medium storing a computer program for controlling a computer to execute respective steps of a control method of an image forming apparatus of claim 6.

10. A non-transitory computer-readable storage medium storing a computer program for controlling a computer to execute respective steps of a control method of an image forming apparatus of claim 7.

11. A non-transitory computer-readable storage medium storing a computer program for controlling a computer to execute respective steps of a control method of an image forming apparatus of claim 8.

* * * * *